United States Patent
Rankin et al.

(10) Patent No.: US 9,828,557 B2
(45) Date of Patent: Nov. 28, 2017

(54) REACTION SYSTEM, METHODS AND PRODUCTS THEREFROM

(71) Applicant: Auterra, Inc., Schenectady, NY (US)

(72) Inventors: Jonathan Rankin, Troy, NY (US); Sarah Clickner, Melrose, NY (US); Kyle Erik Litz, Ballston Spa, NY (US); Larry Neil Lewis, Scotia, NY (US); John Faherty, Queensbury, NY (US); Eric Kolibas, Rensselaer, NY (US); Stephen Hemberger, Niskayuna, NY (US); John Richardson, Glenville, NY (US); Mark Rossetti, Castelton, NY (US)

(73) Assignee: AUTERRA, INC., Schenectady, NY (US)

( * ) Notice: Subject to any disclaimer, the term of this patent is extended or adjusted under 35 U.S.C. 154(b) by 274 days.

(21) Appl. No.: 14/629,169

(22) Filed: Feb. 23, 2015

(65) Prior Publication Data

US 2015/0184086 A1 Jul. 2, 2015

Related U.S. Application Data

(60) Continuation-in-part of application No. 14/159,833, filed on Jan. 21, 2014, now Pat. No. 8,961,779, which
(Continued)

(51) Int. Cl.
*C10G 53/14* (2006.01)
*C10G 27/04* (2006.01)
(Continued)

(52) U.S. Cl.
CPC .......... *C10G 53/14* (2013.01); *B01J 31/0202* (2013.01); *C10G 19/00* (2013.01); *C10G 19/02* (2013.01);
(Continued)

(58) Field of Classification Search
CPC ......... C10G 19/00–19/08; C10G 27/04; C10G 29/20; C10G 29/22; C10G 32/02;
(Continued)

(56) References Cited

U.S. PATENT DOCUMENTS 2,764,525 A 9/1956 Porter et al.
2,789,134 A 4/1957 Nelson et al.
(Continued)

FOREIGN PATENT DOCUMENTS

FR 1299736 A 7/1962
KR 100733571 B1 6/2007
(Continued)

OTHER PUBLICATIONS

Korean Office Action Translation for KR Appln. No. 2009-7024832.
(Continued)

*Primary Examiner* — Renee Robinson
(74) *Attorney, Agent, or Firm* — Schmeiser, Olsen & Watts, LLP

(57) ABSTRACT

A reaction system and method for removing heteroatoms from oxidized-heteroatom-containing hydrocarbon streams and products derived therefrom are disclosed. An oxidized-heteroatom-containing hydrocarbon feed is reacted in a reaction system thereby forming non-ionic hydrocarbon products. The products derived therefrom are useful as transportation fuels, lubricants, refinery intermediates, or refinery feeds.

38 Claims, 8 Drawing Sheets

Related U.S. Application Data is a division of application No. 13/660,371, filed on Oct. 25, 2012, now Pat. No. 8,877,013, which is a continuation of application No. 12/888,049, filed on Sep. 22, 2010, now Pat. No. 8,298,404.

(51) Int. Cl.

| | | |
|---|---|---|
| C10G 29/20 | (2006.01) | |
| C10G 32/02 | (2006.01) | |
| C10G 29/22 | (2006.01) | |
| C10G 27/00 | (2006.01) | |
| C10G 53/12 | (2006.01) | |
| C10G 19/00 | (2006.01) | |
| C10G 19/02 | (2006.01) | |
| B01J 31/02 | (2006.01) | |
| B01J 23/02 | (2006.01) | |

(52) U.S. Cl.
CPC .............. C10G 27/00 (2013.01); C10G 27/04 (2013.01); C10G 29/20 (2013.01); C10G 29/22 (2013.01); C10G 32/02 (2013.01); C10G 53/12 (2013.01); B01J 23/02 (2013.01); B01J 2231/64 (2013.01); B01J 2531/007 (2013.01); C10G 2300/202 (2013.01); C10G 2300/203 (2013.01); C10G 2300/308 (2013.01)

(58) Field of Classification Search
CPC ........ C10G 33/02; C10G 53/06; C10G 53/12; C10G 53/14
See application file for complete search history.

(56) References Cited

U.S. PATENT DOCUMENTS

| | | | |
|---|---|---|---|
| 2,910,434 | A | 10/1959 | Hess et al. |
| 2,987,470 | A | 6/1961 | Turken |
| 3,136,714 | A | 6/1964 | Gibson et al. |
| 3,164,545 | A | 1/1965 | Mattox |
| 3,505,210 | A | 4/1970 | Wallace et al. |
| 3,558,747 | A | 1/1971 | Meltsner |
| 3,565,793 | A | 2/1971 | Herbstman et al. |
| 3,668,117 | A | 6/1972 | Patel et al. |
| 3,819,509 | A | 6/1974 | Wolk et al. |
| 3,847,797 | A | 11/1974 | Pasternak et al. |
| 3,945,914 | A | 3/1976 | Yoo et al. |
| 3,948,759 | A | 4/1976 | King et al. |
| 3,957,620 | A | 5/1976 | Fukui et al. |
| 3,960,706 | A | 6/1976 | McCollum et al. |
| 3,960,708 | A | 6/1976 | McCollum et al. |
| 3,964,995 | A | 6/1976 | Wolk et al. |
| 4,003,823 | A | 1/1977 | Baird et al. |
| 4,088,569 | A | 5/1978 | Couglas |
| 4,119,528 | A | 10/1978 | Baird, Jr. et al. |
| 4,127,470 | A | 11/1978 | Baird, Jr. et al. |
| 4,192,736 | A | 3/1980 | Kluksdahl |
| 4,224,140 | A | 9/1980 | Fujimori et al. |
| 4,374,949 | A | 2/1983 | Massey et al. |
| 4,437,980 | A | 3/1984 | Heredy et al. |
| 4,444,655 | A | 4/1984 | Shiroto et al. |
| 4,591,426 | A | 5/1986 | Krasuk et al. |
| 4,645,589 | A | 2/1987 | Krambeck et al. |
| 4,665,261 | A | 5/1987 | Mazurek |
| 4,923,682 | A | 5/1990 | Roberts et al. |
| 5,064,523 | A | 11/1991 | Kretschmar et al. |
| 5,089,149 | A | 2/1992 | Ridland et al. |
| 5,166,118 | A | 11/1992 | Kretschmar et al. |
| 5,288,681 | A | 2/1994 | Gatsis |
| 5,637,739 | A | 6/1997 | Jacobsen et al. |
| 6,087,662 | A | 7/2000 | Wilt et al. |
| 6,160,193 | A | 12/2000 | Gore |
| 6,245,223 | B1 | 6/2001 | Gorbaty et al. |
| 6,368,495 | B1 | 4/2002 | Kocal et al. |
| 6,403,526 | B1 | 6/2002 | Lussier et al. |
| 6,406,616 | B1 | 6/2002 | Rappas et al. |
| 6,471,852 | B1 | 10/2002 | Mark et al. |
| 6,544,409 | B2 | 4/2003 | DeSouza |
| 6,547,957 | B1 | 4/2003 | Sudhakar et al. |
| 6,673,236 | B2 | 1/2004 | Stanciulescu et al. |
| 6,846,406 | B2 | 1/2005 | Canos et al. |
| 7,144,499 | B2 | 12/2006 | Han et al. |
| 7,153,414 | B2 | 12/2006 | DeSouza |
| 7,179,368 | B2 | 2/2007 | Rabion et al. |
| 7,314,545 | B2 | 1/2008 | Karas et al. |
| 7,371,318 | B2 | 5/2008 | Corma Canos et al. |
| 7,374,666 | B2 | 5/2008 | Wachs |
| 7,598,426 | B2 | 10/2009 | Fang et al. |
| 7,648,625 | B2 | 1/2010 | Bhan et al. |
| 7,678,264 | B2 | 3/2010 | Bhan |
| 7,749,374 | B2 | 7/2010 | Bhan et al. |
| 7,790,021 | B2 | 9/2010 | Kocal et al. |
| 7,875,185 | B2 | 1/2011 | Zhang |
| 7,918,992 | B2 | 4/2011 | Bhan |
| 8,088,706 | B2 | 1/2012 | Domokos et al. |
| 8,197,671 | B2 | 6/2012 | Rankin et al. |
| 8,241,490 | B2 | 8/2012 | Litz et al. |
| 8,298,404 | B2 | 10/2012 | Litz et al. |
| 8,372,777 | B2 | 2/2013 | Bhan et al. |
| 8,394,261 | B2 | 3/2013 | Litz et al. |
| 8,409,541 | B2 | 4/2013 | Reynolds et al. |
| 8,444,061 | B2 | 5/2013 | Van Den Berg et al. |
| 8,450,538 | B2 | 5/2013 | Bhan et al. |
| 8,481,450 | B2 | 7/2013 | Bhan |
| 8,492,599 | B2 | 7/2013 | Bhan et al. |
| 8,530,370 | B2 | 9/2013 | Donaho et al. |
| 8,562,817 | B2 | 10/2013 | Milam et al. |
| 8,562,818 | B2 | 10/2013 | Milam et al. |
| 8,597,608 | B2 | 12/2013 | Reynolds et al. |
| 8,608,946 | B2 | 12/2013 | Bhan et al. |
| 8,764,973 | B2 | 7/2014 | Litz et al. |
| 8,877,013 | B2 | 11/2014 | Litz et al. |
| 8,877,043 | B2 | 11/2014 | Litz et al. |
| 8,894,843 | B2 | 11/2014 | Rankin et al. |
| 8,961,779 | B2 | 2/2015 | Litz et al. |
| 9,061,273 | B2 | 6/2015 | Litz et al. |
| 9,512,151 | B2 | 12/2016 | Litz |
| 2002/0177522 | A1 | 11/2002 | Alexander, IV et al. |
| 2002/0189975 | A1 | 12/2002 | DeSouza |
| 2003/0000867 | A1 | 1/2003 | Reynolds |
| 2003/0149317 | A1 | 8/2003 | Rendina |
| 2004/0108252 | A1 | 6/2004 | DeSouza |
| 2004/0178121 | A1 | 9/2004 | Leyshon et al. |
| 2004/0222134 | A1 | 11/2004 | deSouza |
| 2004/0238410 | A1 | 12/2004 | Inoue et al. |
| 2005/0014850 | A1 | 1/2005 | Hu |
| 2005/0023188 | A1 | 2/2005 | Connor |
| 2006/0011510 | A1 | 1/2006 | Toshima |
| 2006/0154814 | A1 | 7/2006 | Zanibelli et al. |
| 2006/0180501 | A1 | 8/2006 | Da Silva et al. |
| 2006/0231456 | A1 | 10/2006 | Bhan |
| 2006/0231457 | A1 | 10/2006 | Bhan |
| 2006/0234876 | A1 | 10/2006 | Bhan |
| 2007/0000810 | A1 | 1/2007 | Bhan et al. |
| 2007/0051667 | A1 | 3/2007 | Martinie et al. |
| 2007/0256980 | A1 | 11/2007 | Krogue |
| 2007/0295646 | A1 | 12/2007 | Bhan et al. |
| 2008/0083650 | A1 | 4/2008 | Bhan et al. |
| 2008/0087575 | A1 | 4/2008 | Bhan et al. |
| 2008/0121565 | A1 | 5/2008 | Yoo et al. |
| 2008/0135449 | A1 | 6/2008 | Bhan et al. |
| 2008/0308463 | A1 | 12/2008 | Keckler et al. |
| 2009/0065399 | A1 | 3/2009 | Kocal et al. |
| 2009/0188836 | A1 | 7/2009 | Bhan et al. |
| 2010/0055005 | A1 | 3/2010 | Bhan et al. |
| 2010/0098602 | A1 | 4/2010 | Bhan et al. |
| 2011/0000823 | A1 | 1/2011 | Hamad et al. |
| 2011/0011771 | A1 | 1/2011 | Litz et al. |
| 2011/0031164 | A1 | 2/2011 | Litz et al. |
| 2011/0108464 | A1 | 5/2011 | Rankin et al. |
| 2011/0147274 | A1* | 6/2011 | Soto ............ B01D 53/96 208/230 |
| 2011/0178346 | A1 | 7/2011 | Milam et al. |

(56) References Cited

U.S. PATENT DOCUMENTS

| | | | |
|---|---|---|---|
| 2011/0192762 | A1 | 8/2011 | Wellington et al. |
| 2011/0210043 | A1 | 9/2011 | Wellington et al. |
| 2011/0294657 | A1 | 12/2011 | Soled et al. |
| 2012/0055843 | A1 | 3/2012 | Bourane et al. |
| 2012/0055844 | A1 | 3/2012 | Bourane et al. |
| 2012/0055845 | A1 | 3/2012 | Bourane et al. |
| 2012/0055849 | A1 | 3/2012 | Bourane et al. |
| 2012/0067777 | A1 | 3/2012 | Litz et al. |
| 2012/0074040 | A1 | 3/2012 | Koseoglu et al. |
| 2012/0152804 | A1 | 6/2012 | Koseoglu et al. |
| 2012/0285864 | A1 | 11/2012 | Rankin et al. |
| 2012/0285866 | A1 | 11/2012 | Litz et al. |
| 2013/0015104 | A1 | 1/2013 | Al-Hajji et al. |
| 2013/0026062 | A1 | 1/2013 | Al-Shahrani et al. |
| 2013/0026071 | A1 | 1/2013 | Koseoglu et al. |
| 2013/0026075 | A1 | 1/2013 | Koseoglu et al. |
| 2013/0028822 | A1 | 1/2013 | Bourane et al. |
| 2013/0030236 | A1 | 1/2013 | Koseoglu et al. |
| 2013/0048543 | A1 | 2/2013 | Litz et al. |
| 2013/0075305 | A1 | 3/2013 | Al-Shafei et al. |
| 2013/0130892 | A1 | 5/2013 | Litz |
| 2013/0171039 | A1 | 7/2013 | Graham et al. |
| 2013/0185044 | A1 | 7/2013 | Chen et al. |
| 2013/0315793 | A1 | 11/2013 | Koseoglu et al. |
| 2013/0334103 | A1 | 12/2013 | Bourane et al. |
| 2014/0024569 | A1 | 1/2014 | Bera et al. |
| 2014/0131256 | A1 | 5/2014 | Litz et al. |
| 2014/0291199 | A1 | 10/2014 | Litz et al. |
| 2014/0339136 | A1 | 11/2014 | Litz et al. |
| 2015/0337208 | A1 | 11/2015 | Litz et al. |

FOREIGN PATENT DOCUMENTS

| | | |
|---|---|---|
| RU | 2087520 C1 | 8/1997 |
| RU | 2146693 C1 | 3/2000 |
| RU | 2177494 C2 | 12/2001 |
| WO | 0181715 A2 | 11/2001 |
| WO | 2008153633 A1 | 12/2008 |
| WO | 2009120238 A1 | 10/2009 |
| WO | 2012039910 A1 | 3/2012 |
| WO | 2012051009 A1 | 4/2012 |
| WO | 2013188144 A1 | 12/2013 |
| WO | 2014018082 A1 | 1/2014 |
| WO | 2014095813 A1 | 6/2014 |

OTHER PUBLICATIONS

Indian Office Action for IN Application No. 1992/MUMNP/2010, dated Mar. 26, 2015.

Office Action (dated Mar. 20, 2012) for U.S. Appl. No. 12/598,474, filed Apr. 23, 2010.

Office Action (dated Oct. 15, 2012) for U.S. Appl. No. 12/598,474, filed Apr. 23, 2010.

Office Action (dated Sep. 11, 2014) for U.S. Appl. No. 12/598,474, filed Apr. 23, 2010.

Advisory Action (dated Dec. 10, 2014) for U.S. Appl. No. 12/598,474, filed Apr. 23, 2010.

Office Action (dated May 11, 2015) for U.S. Appl. No. 12/598,474, filed Apr. 23, 2010.

Office Action (dated Jun. 19, 2015) for U.S. Appl. No. 14/287,916, filed May 27, 2014.

Notice of Allowance (dated Aug. 4, 2015) for U.S. Appl. No. 14/287,916, filed May 27, 2014.

Canadian Office Action for Appln. No. 2,719,058, dated Dec. 31, 2014.

Notice of Allowance (dated Aug. 9, 2016) for U.S. Appl. No. 12/698,474, filed Apr. 23, 2010.

Office Action (dated Apr. 20, 2016) for U.S. Appl. No. 14/573,230, filed Dec. 17, 2014.

International Search Report and Written Opinion (dated Jun. 20, 2016) for PCT Application No. PCT/US16/024201.

Office Action for Canadian Application No. 2,719,058, dated Aug. 8, 2016.

Notice of Allowance for Canadian Appln No. 2,705,456, dated Sep. 17, 2015.

International Search Report and Written Opinion (dated Aug. 4, 2015) for PCT Application No. PCT/US15/31461.

International Search Report and Written Opinion (dated Aug. 5, 2015) for PCT Application No. PCT/US15/32417.

Jain, Suman L., et al. Rehenium-Catalyzed Highly Efficient Oxidations of Tertiary Nitrogen Compounds to N-Oxides Using Sodium Percarbonate as Oxygen Source. Synlett, 2006, No. 16, pp. 2661-2663. Published on Web Sep. 22, 2006.

McKillop, Alexander, et al. Further Functional-Group Oxidations Using Sodium Perborate Tetrahedron, vol. 45, No. 11, pp. 3299 to 3306, 1989. Published in Great Britain.

Varma, Rajender S., et al. The Urea-Hydrogen Peroxide Complex: Solid-State Oxidative Protocols for Hydroxylated Aldehydes and Ketones (Dakin Reaction), Nitriles, Sulfides, and Nitrogen Heterocycles. Organic Letters, 1999, vol. 1, No. 2, pp. 189-191. Published on Web May 29, 1999.

Jana, Nirmal K., et al. Phase-Vanishing Methodology for Efficient Bromination, Alkylation, Epoxidation, and Oxidation Reactions of Organic Substrates. Organic Letters, 2003, vol. 5, No. 21, pp. 3787-3790. Published on Web Sep. 16, 2003.

Khodaei, Mohammad Mehdi, et al. H2O2/Tf2O System: An Efficient Oxidizing Reagent for Selective Oxidation of Sulfanes. Synthesis, 2008; No. 11, pp. 1682-1684. Published on Web Apr. 11, 2008.

Kim, Sung Soo, et al. A Mild and Highly Efficient Oxidation of Sulfide to Sulfoxides with Periodic Acid Catalyzed by FeCl3. Synthesis, 2002, No. 17, pp. 2484-2486. Published USA Feb. 12, 2002.

Qian, Weixing, et al. Efficient and Highly Selective Oxidation of Sulfides to Sulfoxides in the Presence of an Ionic Liquid Containing Hypervalent Iodine. Synlett, 2006, No. 5, pp. 709-712. Published on Web Mar. 9, 2006.

Matteucci, Mizio, et al. Mild and Highly Chemoselective Oxidation of Thioethers Mediated by Sc(OTf)3. Organic Letters, 2003, vol. 5, No. 3, 235-237. Published on Web Jan. 11, 2003.

Mba, Myriam, et al. C3-Symmetric Ti(IV) Triphenolate Amino Complexes as Sulfoxidation Catalysts with Aqueous Hydrogen Peroxide. Organic Letters, 2007, vol. 9, No. 1, pp. 21-24. Published on Web Dec. 9, 2006.

Drago, Carmelo, et al. Vanadium-Catalyzed Sulfur Oxidation/Kinetic Resolution in the Synthesis of Enantiomerically Pure Alkyl Aryl Sulfoxides. Agnew. Chem. Int. Ed, 2005, 44, pp. 7221-7223. Published on Web Oct. 17, 2005.

Egami, Hiromichi, et al. Fe(salan)-Catalyzed Asymmetric Oxidation of Sulfides with Hydrogen Peroxide in Water. J. Am. Chem. Soc., 2007, vol. 129, No. 29, pp. 8940-8941. Published on Web Jun. 29, 2007.

Sun, Jiangtao, et al. Efficient Asymmetric Oxidation of Sulfides and Kinetic Resolution of Sulfoxides Catalyzed by a Vanadium-Salan System. J. Org. Chem., 2004, vol. 69, No. 24, pp. 8500-8503. Published on Web Oct. 28, 2004.

Karimi, Babak, et al. Selective Oxidation of Sulfides to Sulfoxides Using 30% Hydrogen Peroxide Catalyzed with a Recoverable Silica-Based Tungstate Interphase Catalyst. Organic Letters, 2005, vol. 7, No. 4, pp. 625-628. Published on Web Jan. 25, 2005.

Ali, Mohammed Hashmat, et al. Ceric Ammonium Nitrate Catalyzed Oxidation of Sulfides to Sulfoxides. Synthesis, 2007, No. 22, pp. 3507-3511. Published on Web Oct. 16, 2007.

Imada, Yasushi, et al. Flavin Catalyzed Oxidations of Sulfides and Amines with Molecular Oxygen. J. Am Chem. Soc., 2003, vol. 125, No. 10, pp. 2868-2869. Published on Web Feb. 12, 2003.

Varma, Rajender S., et al. The Urea-Hydrogen Peroxide Complex: Solid-State Oxidatives Protocols for Hydroxylated Aldehydes and Ketones (Dakin Reaction), Nitriles, Sulfides, and Nitrogen Heterocycles. Organic Letters, 1999, vol. 1, No. 2, pp. 189-191. Published on Web May 29, 1999.

Jana, Nirmal K.,e t al. Phase-Vanishing Methodology for Efficient Bromination, Alkylation, Epoxidation, and Oxidation Reactions of

(56) References Cited

OTHER PUBLICATIONS

Organic Substrates. Organic Letters, 2003, vol. 5, No. 21, pp. 3787-3790. Published on Web Sep. 16, 2003.
Shaabani, Ahmad, et al. Green oxidations. The use of potassium permanganate supported on manganese dioxide. Tetrahedron, 2004, 60, pp. 11415-11420. Published on Web Oct. 12, 2004.
Wozniak, Lucyna A., et al. Oxidation in Organophosphorus Chemistry: Potassium Peroxymonosulphate. Tetrahedron, 1999, 40, pp. 2637-2640. No published date.
Akasaka, Takeshi,e t al. Singlet Oxygen Oxidation of Organophosphorus Compounds: Cooxidation of Olefin with Phosphadioxirane. Quimica Nova, 1993, 16, pp. 325-327. No published date or location.
Milner, O.I., et al. Determination of Trace Materials in Crudes and Other Petroleum Oils. Analytical Chemistry, vol. 24, No. 11. Published Nov. 1952, USA.
Aida, Tetsuo, et al. Development of an Efficient Coal-Desulfurization process: "Oxy-Alkalinolysis". Technical Report Resource Conference: American Chemical Society symposium on coal liquefaction, pp. 328-334. Kansas City, MO USA. Published Sep. 1, 1982 Ames Lab., IA (USA); Advanced Fuel Research, Inc., East Hartford, CT (USA).
Aida, Tetsuo, et al. Reaction of Dibenzothiophene Sulfone with Alkoxides. Tetrahedron Letters (1983), vol. 24, No. 34, pp. 3543-3546. USA.
Oviedo, Alberto, et al. Deoxydesulfurization of sulfones derived from dibenzothiophene using nickel compounds. Journal of Molecular Catalysis A: Chemical, (2008) 293, pp. 65-71. USA.
Ripin, D.H., et al., "pKas of Inorganic and Oxo-Acids", [http://evans.harvard.edu/pdf/evans_pka_table.pdf]; published Apr. 11, 2005, accessed Apr. 29, 2013. 6 pages.
Application No. PCT/US2008/82095, International Search Report and the Written Opinion of the International Searching Authority, or the Declaration dated Mar. 20, 2009. 12 pages.
Application No. PCT/US2011/50159, International Search Report and the Written Opinion of the International Searching Authority dated Jan. 12, 2012, 11 pages.
Application No. PCT/US2011/54840, International Search Report and the Written Opinion of the International Searching Authority dated Mar. 12, 2012, 8 pages.
Application No. PCT/US2011/70243, International Search Report and the Written Opinion of the International Searching Authority dated Feb. 25, 2013, 40 pages.
U.S. Appl. No. 14/246,508, filed Apr. 7, 2014.
U.S. Appl. No. 14/287,916, filed May 27, 2014.
U.S. Appl. No. 14/286,342, filed May 23, 2014.
Application No. PCT/US2013/43843, International Search Report and the Written Opinion of the International Searching Authority dated Aug. 27, 2013, 7 pages.
U.S. Appl. No. 14/573,230, filed Dec. 17, 2014.
Office Action (dated Jan. 21, 2015) for U.S. Appl. No. 14/287,916, filed May 27, 2014.
Final Office Action (dated May 6, 2016) for U.S. Appl. No. 12/598,474, filed Apr. 23, 2010.
Office Action (dated Jun. 15, 2016) for U.S. Appl. No. 14/246,508, filed Apr. 7, 2014.
Office Action (dated Apr. 22, 2016) for U.S. Appl. No. 14/286,342, filed May 23, 2014.
Energy Intelligence Group. (2007). "The Crude Oils and their Key Characteristics, " 7 pgs. (Available at http://www.energyintel.com/pages/eig_article.aspx?DocId=200017).
El Nady, M. M. et al. (2013). Journal of Chemical and Engineering Data, 1, 1-7.
International Search Report and Written Opinion (dated Feb. 16, 2016) for PCT Application No. PCT/US15/064587.
European Office Action for Application No. 11 833 137.0-1361, dated Aug. 13, 2015.
Office Action (dated Nov. 20, 2015) for U.S. Appl. No. 12/598,474, filed Apr. 23, 2010.
http://evans.rc.fas.harvard.edu/pdf/evans_pKa table. Pdf.
Jiang, Benpeng et al., ("Hydrothermal synthesis of rutile TiO2 nanoparticles using hydroxyl and carboxyl group-containing organics as modifiers." Materials Chemistry and Physics, pp. 231-235), 2006.
EP Office Action for EP Application No. 13 803 981.3, dated Dec. 6, 2016.
GCC Patent Office Exam Report for Application No. GC 2013-24619, dated Nov. 26, 2016.
Russian Search Report for Russian Application No. 2014152661/04, dated Apr. 26, 2017.

\* cited by examiner

REACTION SYSTEM, METHODS AND PRODUCTS THEREFROM

CROSS-REFERENCE TO RELATED APPLICATIONS

This application is a continuation in part application of U.S. patent application Ser. No. 14/159,833, filed Jan. 21, 2014, entitled "Reaction System and Products Therefrom", set to issue as U.S. Pat. No. 8,961,779 on Feb. 24, 2015. The '833 application is a divisional application claiming priority and benefit of U.S. patent application Ser. No. 13/660,371, filed Oct. 25, 2012 and issued as U.S. Pat. No. 8,877,013 on Nov. 4, 2014, which is a continuation application claiming priority and benefit from U.S. application Ser. No. 12/888, 049, filed Sep. 22, 2010 and now, U.S. Pat. No. 8,298,404.

FIELD OF DISCLOSURE

The disclosure relates to methods for reducing hydrocarbon contaminants, specifically, reducing the concentration of heteroatom contaminants, heteroatom containing salts and caustic byproducts, while increasing heteroatom-free hydrocarbon content and non-oxygenated hydrocarbon products.

BACKGROUND

The present disclosure is directed to systems and methods for treating crude oil, intermediate refining streams, and refining products to substantially reduce the content of undesired heteroatoms, specifically sulfur, nitrogen, nickel, vanadium, iron and reduce the total acid number and to do so utilizing equipment that has a relatively low capital investment and is economical to operate.

Systems and methods for removing oxidized-heteroatom contaminants including, but not limited to, sulfur, nitrogen, nickel, vanadium, iron and reduce the total acid number of liquid hydrocarbon feed streams are disclosed. After subjecting a liquid hydrocarbon stream to oxidation conditions, thereby oxidizing at least a portion of the heteroatom compounds (e.g., oxidizing dibenzothiophenes to sulfones), the oxidized heteroatom compounds are reacted with caustic (e.g., sodium hydroxide, potassium hydroxide, eutectic mixtures thereof etc.) and a selectivity promoter to produce substantially lower heteroatom-containing hydrocarbon products.

As is well known in the industry, crude oil contains heteroatoms such as sulfur, nitrogen, nickel, vanadium and acidic oxygenates in quantities that negatively impact the refinery processing of the crude oil fractions. Light crude oils or condensates contain heteroatoms in concentrations as low as 0.001 Wt %. In contrast, heavy crude oils contain heteroatoms as high as 5-7 Wt %. The heteroatom content of crude oil increases with increasing boiling point and the heteroatom content increases with decreasing API gravity. These impurities must be removed during refining operations to meet the environmental regulations for the final product specifications (e.g., gasoline, diesel, fuel oil) or to prevent the contaminants from decreasing catalyst activity, selectivity, and lifetime in downstream refining operations. Contaminants such as sulfur, nitrogen, trace metals, and total acid number (TAN) in the crude oil fractions negatively impact these downstream processes, and others, including hydrotreating, hydrocracking and FCC to name just a few. These contaminants are present in the crude oil fractions in varying structures and concentrations.

It is widely recognized that the emission of sulfur oxides from fossil fuel combustion causes a serious atmospheric pollution problem. Indeed, the sulfur is converted through combustion into various sulfur oxides that can be transformed into acids, thus, it is believed, $SO_x$ emissions contribute to the formation of acid rain and also to the reduction of the efficiency of catalytic converters in automobiles. Furthermore, sulfur compounds are thought to ultimately increase the particulate content of combustion products.

A variety of methods have been proposed for removing sulfur compounds either from fuels before combustion or from emission gases afterward. Most refineries employ hydrodesulfurization (HDS) as the predominant process for removing sulfur from hydrocarbon streams. HDS remains a cost-effective option for light streams with sulfur levels up to about 2% (w/w) elemental sulfur. But the environmental benefits of HDS are offset in very heavy and sour (>2% elemental sulfur) streams because the energy input to the reaction, the high pressures and the amount of hydrogen necessary to remove the sulfur paradoxically create a substantial $CO_2$ emission problem.

Because of these issues, reduction of contaminants and, in particular, of the sulfur content in hydrocarbon streams has become a major objective of environmental legislation worldwide. Pending sulfur regulations in the United States for on-road diesel will be 15 ppm in NRLM diesel fuel. As of October 2012, on road diesel sulfur specifications are 15 ppm for NRLM diesel fuel. In the European Union that specification has tightened to 10 ppm in January 2011 for diesels intended for inland waterways and for on-road and off-road diesel operated equipment. In China, the on-road diesel specification are 10 ppm as of 2012. Currently Japan, also has on-road diesel specification of 10 ppm.

Refiners typically use catalytic hydrodesulfurizing ("HDS", commonly referred to as "hydrotreating") methods to lower the sulfur content of hydrocarbon fuels. In HDS, a hydrocarbon stream that is derived from a petroleum distillation is treated in a reactor that operates at temperatures ranging between 575 and 750° F. (about 300 to about 400° C.), a hydrogen pressure that ranges between 430 to 14,500 psi (3000 to 10,000 kPa or 30 to 100 atmospheres) and hourly space velocities ranging between 0.5 and 4 $h^{-1}$. Dibenzothiophenes in the feed react with the hydrogen when in contact with a catalyst arranged in a fixed bed that comprises metal sulfides from groups VI and VIII (e.g., cobalt and molybdenum sulfides or nickel and molybdenum sulfides) supported on alumina. Because of the operating conditions and the use of hydrogen, these methods can be costly both in capital investment and operating costs.

As is currently known, HDS or hydrotreating may provide a treated product in compliance with the current strict sulfur level targets. However, due to the presence of sterically hindered refractory sulfur compounds such as unsubstituted and substituted dibenzothiophenes, the process is not without issues. For example, it is particularly difficult to eliminate traces of sulfur using such catalytic processes when the sulfur is contained in molecules such as dibenzothiophene with alkyl substituents in position 4, or 4 and 6. Attempts to completely convert these species, which are more prevalent in heavier stocks such as diesel fuel and fuel oil, have resulted in increased equipment costs, more frequent catalyst replacements, degradation of product quality due to side reactions, and continued inability to comply with the strictest sulfur requirements for some feeds.

This has prompted many to pursue non-hydrogen alternatives to desulfurization, such as oxydesulfurization. One attempt at solving the thiophene problem discussed above includes selectively desulfurizing dibenzothiophenes contained in the hydrocarbon stream by oxidizing the dibenzothiophenes into a sulfone in the presence of an oxidizing agent, followed by optionally separating the sulfone compounds from the rest of the hydrocarbon stream. Oxidation has been found to be beneficial because oxidized sulfur compounds can be removed using a variety of separation processes that rely on the altered chemical properties such as the solubility, volatility, and reactivity of the sulfone compounds. One specific sulfoxidation method and system is disclosed in International Publication Number WO 2009/120238 A1, to Litz et al., the disclosure of which is hereby incorporated by reference to the extent not inconsistent with the present disclosure.

One issue with sulfoxidation lies in the disposal of the sulfones. If the sulfones are hydrotreated, they may be converted back to the original dibenzothiophene compounds thereby regenerating the original problem. The feed sulfur content may be likely to be in the range of 0% to 10% weight sulfur. Sulfur, on average, comprises about 15 wt % of substituted and unsubstituted dibenzothiophene molecules. Therefore, up to 67 wt % of the oil may be removed as sulfone extract. For a typical refinery processing 40,000 barrels per day of crude oil, up to 27,000 barrels per day of sulfone oil will be generated, which is believed to be too much to dispose conventionally as a waste product. Further, the disposal of sulfone oil also wastes valuable hydrocarbons, which could theoretically be recycled if an efficient process were available.

As stated above, the primary challenge presented to oxydesulfurization remains the removal of the $SO_x$ from the sulfone and sulfoxide groups created by oxidation of the initial organic sulfur species. Kocal et al., U.S. Pat. No. 7,790,021 B2, the disclosure of which is hereby incorporated by reference to the extent not inconsistent with the present disclosure, teach the use of an aqueous caustic stream and a caustic waste stream to treat the sulfones and sulfoxide streams to produce substituted biphenyls. The problem with the disclosed method is the costly extra steps to remove the substituted biphenyl products from the aqueous caustic stream and the lack of selectivity towards unsubstituted biphenyls, and the lack of teaching any effect on other heteroatom-containing species.

A similar teaching of the use of molten caustic was disclosed by Aida et al (reference) to treat the sulfones in oxidized coal. Aida's teaching gives rise to ionizable and non-ionizable biphenyls with no apparent selectivity to product formation. Aida later teaches (Tetrahedron Letters publication) that desulfonylation with caustic alkoxide ions proceeds with predominant formation of carbon oxygen bond formation but still substantive formation of hydroxybiphenyls which are extremely challenging to separate from the caustic stream because they are ionizable.

Garcia et al (J. Mol Catalysis 2008) teach a desulfonylation reaction catalyzed by nickel compounds. Aida and Kocal et al. showed that caustics react with sulfones, but their methods do not show selectivity to unsubstituted products and has not been shown capable of removing other heteroatoms. Garcia et al. show that there is a way to selectively make unsubstituted biphenyls from sulfones, but fail do so in a cost effective manner and they do not demonstrate the capability of removing other heteroatoms. The method unfortunately employs an expensive stoichiometric Grignard reagent to selectively form unsubstituted biphenyl products and is therefore unsuited to commercial fuel treatment for economic reasons.

Documents and references believed relevant to the present disclosure follow:

Reaction of Dibenzothiophene Sulfone with Alkoxides Aida, T.; Squires, T. G.; Venier, C. G. Tetrahedron Letters, (1983), 24(34) p 3543-3546

Development of an efficient coal-desulfurization process: oxy-alkalinolysis Authors Aida, T.; Venier, C. G.; Squires, T. G. Publication Date 1982 Sep. 1 Technical Report Resource Conference: American Chemical Society symposium on coal liquefaction, pages 328-334 Kansas City, Mo., USA, 1 Sep. 1982 Ames Lab., Iowa (USA); Advanced Fuel Research, Inc., East Hartford, Conn. (USA) Deoxydesulfurization of Sulfones Derived from Dibenzothiophene using Nickel Compounds, Authors: Alberto Oviedo, Jorge Torres-Nieto, Alma Arevalo, and Juventino J. Garcia. J. Mol. Catalysis A: Chemical, (2008) 293, p 65-71.

It has long been known that various metallic elements are found in naturally occurring and synthetic crude oils (see O. I. Miller et al, Anal. Chem., 24, 1728 [1952]).

Some of these metal impurities are known to be harmful when present in charge stocks for petroleum refining, for example cracking, when present in fuels for boilers and turbines and the like uses.

A process for removing vanadium and sodium from a crude oil is disclosed in U.S. Pat. No. 2,764,525 (F. W. Porter et al) wherein the oil is contacted in the presence of hydrogen with alumina containing a minor amount of ferric oxide.

A method of treating petroleum oil containing trace metal components is disclosed in U.S. Pat. No. 2,910,434 (H. V. Hess, et al) wherein the oil is contacted with an inert packing material in the presence of hydrogen gas.

In U.S. Pat. No. 2,987,470 (M. Turken) a process is disclosed for demineralizing oil by contact thereof in an ebullated bed with particulate contact materials, for example bauxite, alumina and the like.

In U.S. Pat. No. 3,819,509 (R. H. Walk et al) metal- and sulfur-containing contaminants in a residual oil are removed from the oil by contacting the oil in the presence of desulfurization catalyst and an intimate admixture of inert demetallization solids.

In U.S. Pat. No. 3,964,995 (R. H. Walk et al) metals are removed from sulfur- and metals-contaminated oil using porous alumina solids activated with an oxide promoter of the group $Fe_2O_3$, $TiO_2$ and $SiO_2$.

In U.S. Pat. No. 4,192,736 (Kluksdahl) metals are removed from oil by contact with alumina containing a phosphorous oxide promoter.

In U.S. Pat. No. 4,645,589 (F. J. Krambeck et al) metals are removed from oil by aqueous phase extraction with a phosphorous compound.

A process for removing metals and coke precursors is disclosed in U.S. Pat. No. 6,245,223 (M. L. Gorbaty et al) wherein the oil is contacted with a solid, low surface area adsorbent.

Therefore, there is a need for a selective process for removing heteroatoms (including, but not limited to, sulfur, nitrogen, nickel, vanadium, iron and the like) from an oxidized-heteroatom-containing hydrocarbon stream thereby avoiding the need of expensive reagents, waste disposal, and other separation and handling as well as cost issues associated with the waste streams.

SUMMARY OF THE DISCLOSURE

A first aspect of the present disclosure relates to a method for reducing heteroatom content of a hydrocarbon feed comprising the steps of oxidizing the hydrocarbon feed to an oxidized heteroatom-containing hydrocarbon feed, contacting the heteroatom-containing hydrocarbon feed with a mixture comprising a phenol-derived catalyst, a caustic and a selectivity promoter, and producing from said contacting step, a hydrocarbon product having a heteroatom content that is less than the heteroatom content of the heteroatom-containing hydrocarbon feed. A second aspect of the present disclosure relates to a method for reducing heteroatom content of a hydrocarbon feed comprising the steps of contacting an oxidized heteroatom containing hydrocarbon feed with a caustic treatment solution, producing from said contacting step, a hydrocarbon phase having a hydrocarbon product and at least one of a sulfite salt and a sulfate salt, and an aqueous phase, separating the hydrocarbon phase from the aqueous phase, mixing the hydrocarbon phase with an aqueous wash feed, producing a washed hydrocarbon phase and an aqueous wash phase; and extracting the washed hydrocarbon phase from the aqueous wash phase.

The inventors of the present disclosure have unexpectedly discovered that the removal of heteroatoms from substantially oxidized-heteroatom-containing hydrocarbon streams may be promoted by employing the novel reaction system detailed herein. What we herein disclose are systems and methods for showing selectivity toward non-ionic hydrocarbon products employing a novel caustic reaction system. Not only have we learned that our reaction system functions for sulfur removal but we also have learned that it has a beneficial capability of removing nitrogen, trace metals and reducing the total acid number of a hydrocarbon fuel and increasing the API gravity. A reaction method and system for decreasing the heteroatom content, decreasing the total acid number, and increasing the API gravity from a substantially oxidized-heteroatom-containing hydrocarbon feed stream, including, but not limited to, internal refinery streams, crude oil or distilled fraction of crude oil is disclosed. The reaction system may be presently preferably heated and may comprise a feed inlet region, a reaction region and an outlet region; the reaction region may comprise a caustic compound, optionally a mixture of caustic compounds, and optionally supported on an inert metal oxide, and a molten caustic liquid, and optionally a molten caustic mixture; the inlet region receives the feed independently or as a mixture comprising a oxidized-heteroatom-rich hydrocarbon and a selectivity promoter that combine to contact with the caustic compound(s); wherein the oxidized-heteroatom-rich hydrocarbons react with the caustic and selectivity promoter producing substantially non-ionic hydrocarbon products that exit via the outlet region with a lower heteroatom content than the feed.

The caustic component of the reaction region of the system of the present disclosure may be any inorganic compounds that exhibit basic properties; presently preferably inorganic oxides from group IA and IIA elements; more presently preferably inorganic hydroxides from group IA and IIA elements, or optionally mixtures of oxides and hydroxides of group IA and IIA elements; even more presently preferably molten hydroxides of group IA and IIA elements, or optionally mixtures of hydroxides of said elements; and presently most preferably molten NaOH, KOH, or a mixture thereof. Non-limiting examples may include, but are not limited to, $Li_2O$, $Na_2O$, $K_2O$, $Rb_2O$, $Cs_2O$, $Fr_2O$, BeO, MgO, CaO, SrO, BaO, and the like as well as LiOH, NaOH, KOH, RbOH, CsOH, FrOH, $Be(OH)_2$, $Mg(OH)_2$, $Ca(OH)_2$, $Sr(OH)_2$, $Ba(OH)_2$, green liquor, and the like, and their mixtures or molten mixtures thereof.

Embodiments of Green liquor may contain a combination of water, $NaCO_3$ and $Na_2S$. In some embodiments, Green liquor may further include in some embodiments NaOH, $Na_2SO_4$, NaCl, iron sulfide, as well as potassium salts.

The optional support components of the reaction region of the reaction system of the present disclosure may be any inorganic oxide, either inert or active; in particular a porous support such as talc or inorganic oxides may be utilized as support components.

Suitable inorganic oxides may be oxides of elements of groups 2, 3, 4, 5, 13, 14, 15 and 16 of the Periodic Table of the Elements. Examples of oxides preferred as supports may include silicon dioxide, aluminum oxide and also mixed oxides of the two elements and corresponding oxide mixtures. Other inorganic oxides which may be used alone or in combination with the abovementioned preferred oxide supports may be, for example, MgO, $ZrO_2$, $TiO_2$ or CaO, to name only a few.

The support materials used may have a specific surface area in the range from 10 to 1000 $m^2/g$, a pore volume in the range from 0.1 to 5 ml/g and a mean particle size of from 0.1 to 10 cm. Preference may be given to supports having a specific surface area in the range from 0.5 to 500 $m^2/g$, a pore volume in the range from 0.5 to 3.5 ml/g and a mean particle size in the range from 0.5 to 3 cm. Particular preference may be given to supports having a specific surface area in the range from 200 to 400 $m^2/g$, and a pore volume in the range from 0.8 to 3.0 ml/g.

The selectivity promoter may be an organic alcohol, ROH, wherein R is a C1-C18 alkyl-, aryl-, or alkenyl-group, that produces non-ionic hydrocarbon product from the oxidized-heteroatom feed. The hydrocarbon product may be substantially insoluble in the molten caustic and exits the outlet region and may be preferred to a reaction system not containing a selectivity promoter because the reaction products with caustics may tend to be organic hydroxides which are substantially in the ionic form in severely caustic environments and thus may be more challenging to separate from the caustic without considerable expense. The selectivity promoter may be more preferably an alcohol, a diol, or a polyol and mixtures thereof. Non limiting examples include, but are not limited to: methanol, benzyl alcohol, ethylene glycol, propylene glycol, glycerol, pinacol, 1,3-propanediol and the like that may produce non-ionic product from the oxidized-heteroatom feed. The non-ionic product may be substantially insoluble and/or inert to caustic and exits the outlet region and may be more preferred to a reaction system containing ionic products.

In order to provide a reaction system for decreasing the heteroatom content (sulfur, nitrogen, vanadium, and nickel), decreasing the Total Acid Number, and increasing API gravity of heteroatom-containing hydrocarbon feed streams, the reaction system is preferably heated and comprises a feed inlet region, a reaction region and an outlet region; the reaction region comprises a caustic compound, optionally a mixture of caustic compounds, and optionally supported on an inert metal oxide, and optionally a molten caustic liquid, and optionally a molten caustic mixture; the inlet region receives the hydrocarbon feed independently or as a mixture comprising a oxidized-heteroatom-rich hydrocarbon and a selectivity promoter that combine to contact with the caustic compound(s); wherein the oxidized-heteroatom-rich hydrocarbons react with the caustic and selectivity promoter producing substantially non-ionic hydrocarbon products that exit via the outlet region with a lower heteroatom content than the feed.

The caustic component operatively positioned in the reaction region of the system of the present disclosure may be any inorganic compounds that exhibit basic properties which includes, but is not limited to, inorganic oxides from group IA and IIA elements, inorganic hydroxides from group IA and IIA elements, or optionally mixtures of oxides and hydroxides of group IA and IIA elements, molten hydroxides of group IA and IIA elements, or optionally mixtures of hydroxides of said elements. Presently preferably inorganic oxides or hydroxides from group IA and IIA elements. More presently preferably inorganic hydroxides from group IA and IIA elements, or optionally mixtures of oxides and hydroxides of group IA and IIA elements. Even more presently preferably molten hydroxides of group IA and IIA elements, or optionally mixtures of hydroxides of said elements. Presently most preferably molten NaOH, KOH, or a mixture thereof. Non-limiting examples may include $Li_2O$, $Na_2O$, $K_2O$, $Rb_2O$, $Cs_2O$, $Fr_2O$, BeO, MgO, CaO, SrO, BaO, and the like as well as LiOH, NaOH, KOH, RbOH, CsOH, FrOH, $Be(OH)_2$, $Mg(OH)_2$, $Ca(OH)_2$, $Sr(OH)_2$, $Ba(OH)_2$, green liquor, and the like, and their mixtures or molten mixtures thereof.

Optional support components of the reaction region of the reaction system of the present disclosure may be any inorganic oxide, inert or active, such as, for example, a porous support such as talc or inorganic oxides.

Suitable inorganic oxides are oxides of elements of groups 2, 3, 4, 5, 13, 14, 15 and 16 of the Periodic Table of the Elements. Examples of oxides preferred as supports include silicon dioxide, aluminum oxide and also mixed oxides of the two elements and corresponding oxide mixtures. Other inorganic oxides which can be used alone or in combination with the abovementioned preferred oxide supports are, for example, MgO, $ZrO_2$, $TiO_2$ or CaO, to name only a few.

The support materials used have a specific surface area in the range from 10 to 1000 $m^2/g$, a pore volume in the range from 0.1 to 5 ml/g and a mean particle size of from 0.1 to 10 cm. Preference is given to supports having a specific surface area in the range from 0.5 to 500 $m^2/g$, a pore volume in the range from 0.5 to 3.5 ml/g and a mean particle size in the range from 0.5 to 3 cm. Particular preference is given to supports having a specific surface area in the range from 200 to 400 $m^2/g$, and a pore volume in the range from 0.8 to 3.0 ml/g.

Other advantages and features will be apparent from the following detailed description when read in conjunction with the attached drawings including the application of the disclosed techniques to streams other than diesel, such as, for example, crude oil, bitumen, gas oils, kerosene, transportation fuels, lubricants, and refinery intermediates and other contaminated hydrocarbon streams containing sulfur and other contaminants.

BRIEF DESCRIPTION OF THE DRAWINGS

Some of the embodiments will be described in detail, with reference to the following figures.

DETAILED DESCRIPTION OF THE DISCLOSURE

Figure 1:
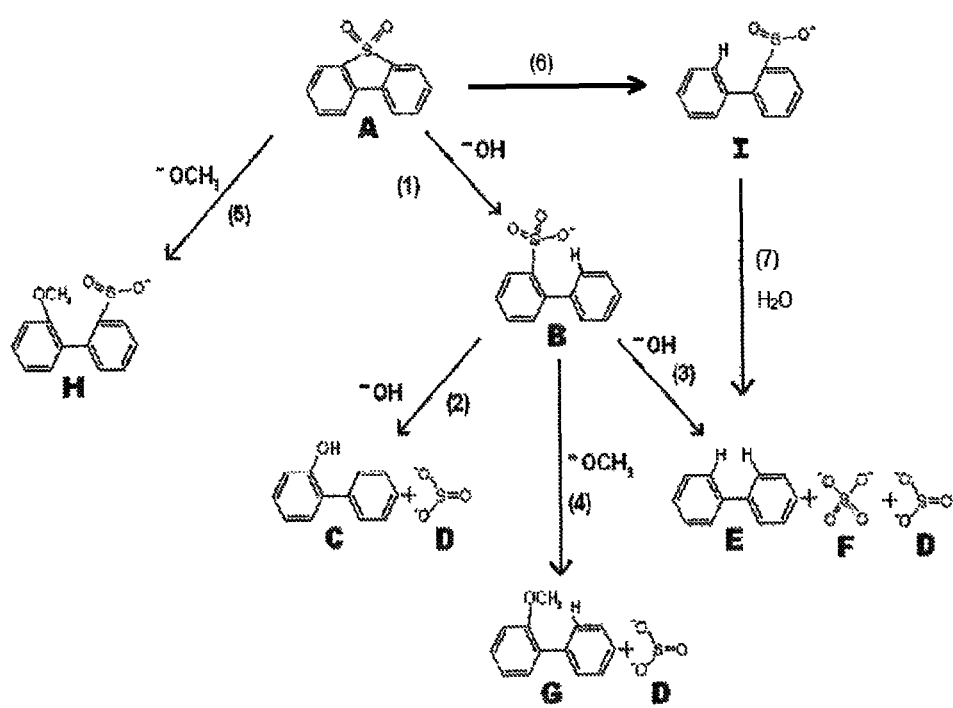
FIG. 1 depicts a schematic view of reaction pathways of a sulfur containing hydrocarbon.

Unless otherwise indicated, all numbers expressing quantities of ingredients, properties such as molecular weight, reaction conditions, and so forth used in this specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Certain embodiments are described in detail below. Terms used herein may be defined as follows:

Unless otherwise noted, the term "effective amount," as used herein, includes that amount of a substance capable of either increasing (directly or indirectly) the yield of the desulfonylation product or increasing selectivity towards sulfur-free product formation.

Unless otherwise noted, optimum amounts of a given catalyst, heat or steam can vary based on reaction conditions and the identity of other constituents yet can be readily determined in light of the discrete circumstances of a given application.

Unless otherwise noted, the term "conversion" or more precisely "percent conversion" ("% cony."), as used herein, describes the proportion of moles of sulfone converted by the combination of desulfonylation and deoxygenation reactions relative to sulfone fed into the reaction.

Unless otherwise noted, the term "selectivity" as used herein describes the mole percent products converted that contain no sulfur. Unless otherwise noted, the term "yield" as used here and describes the mole percent products converted to a non-ionic hydrocarbon.

"Alkali metal" may refer to any of the elements listed in group 1 of the Periodic Table of Elements, including Li, Na, K, Rb, Cs, and Fr.

"Alkaline earth metal" may refer to any of the elements listed in group 2 of the Periodic Table of Elements, including Be, Mg, Ca, Sr, Ba, and Ra.

"ASTM" refers to American Standard Testing and Materials.

"API gravity" refers to American Petroleum Institute gravity ("API gravity") at 15.5° C. (approximately 60° F.), unless stated otherwise. API gravity may be determined by ASTM Method D6822 or equivalent method. API gravity, is a measure of how heavy or light a petroleum liquid is compared to water. If its API gravity is greater than 10, it is lighter and floats on water; if less than 10, it is heavier and sinks API gravity is thus an inverse measure of the relative density of a petroleum liquid and the density of water, but it is used to compare the relative densities of petroleum liquids. For example, if one petroleum liquid floats on another and is therefore less dense, it has a greater API gravity. Although mathematically, API gravity has no units, it is nevertheless referred to as being in "degrees" or according to the ASTM, API gravity may also be described in units of kg/m3. API gravity is typically gradated in degrees on a hydrometer instrument. Methods for determining API may be performed, using a glass thermohydrometer in conjunction with a series of calculations, of the density, relative density, or API gravity of crude petroleum, petroleum products, or mixtures of petroleum and nonpetroleum products which may be handled as liquids having a Reid vapor pressures of 101.325 kPa (14.696 psi) or less. Values are determined at the existing temperatures and may be corrected to 15° C. or 60° F.

"Aqueous wash phase" refers to a phase that is primarily water in a separation of two or more phases. The aqueous wash phase may contain other caustic residues, salts, alcohols, or hydrocarbons.

"Biphasic" means a chemical system that contains two separate and distinct immiscible chemical phases. These phases may be any immiscible substances, including gas-liquid, gas-solid, liquid-liquid and liquid-solid phases.

"Caustic contaminated hydrocarbon" may refer to a mixture or combination of one or more hydrocarbons and the presence of at least one or more caustic residues.

"Contaminated hydrocarbon stream" may refer to a mixture of hydrocarbons containing heteroatom constituents.

"Halide" refers to a binary compound comprising of a halogen and another element of the Periodic Table of Elements.

"Halogen" refers to a group 17 element of the Periodic Table of Elements, including F, Cl, Br and I.

"Hydrocarbon(s)" refers to a substance that has primary components of hydrogen and carbon. Hydrocarbons may include, but are not limited to both saturate and unsaturated forms of aromatic hydrocarbons, alkanes, alkenes, alkynes, aryls and cycloalkanes.

"Hydrocarbon feed" refers to a feed that includes hydrocarbons. The hydrocarbon feed may include, but is not limited to, crudes, heavy or extra heavy crudes, crude oils containing significant quantities of residue or pitch, bitumen, disadvantaged crudes, contaminated hydrocarbon streams, hydrocarbons derived from tar sands, shale oil, crude atmospheric residues, asphalts, hydrocarbons derived from liquefying coal and hydrocarbons obtained from a refinery process or mixtures thereof. The hydrocarbon feed may include hydrocarbons and a mixture of one or more heteroatoms. Common sulfur containing contaminants to a hydrocarbon feed may be mercaptans, sulfides, disulfides, thiophenes, benzothiophenes, dibenzothiophenes and benzonaphthothiophenes.

"Hydrocarbon phase" refers to a phase that is primarily hydrocarbons in a separation of two or more phases, for example, in a biphasic system. The hydrocarbon phase may include, but is not limited to, crudes, heavy or extra heavy crudes, crude oils containing significant quantities of residue or pitch, bitumen, disadvantaged crudes, contaminated hydrocarbon streams, hydrocarbons derived from tar sands, shale oil, crude atmospheric residues, asphalts, hydrocarbons derived from liquefying coal and hydrocarbons obtained from a refinery process or mixtures thereof. The hydrocarbon phase may include hydrocarbons and a mixture of one or more heteroatoms.

"Liquid mixture" refers to a composition that includes one or more compounds that are liquid at standard temperature and pressure (25° C., 0.101 MPa, hereinafter referred to as "STP"), or a composition that includes a combination of one of more compounds that are liquid at STP with one or more compounds that are solids at STP.

"Promoted caustic visbreaker" refers to a heated reactor that contains a caustic and a selectivity promoter that react with oxidized heteroatoms to remove sulfur, nickel, vanadium, iron and other contaminants or heteroatoms, increase API gravity, decrease viscosity, and decreases total acid number.

"Sulfate" refers to any chemical compound containing a sulfate anion, having the formula $SO_4^{(2-)}$, containing a sulfur atom bound to four oxygen atoms, with a net −2 charge. Sulfates may be bound to cations such as sodium, potassium, or others.

"Sulfite" refers to any chemical compound containing a sulfite anion, having the formula $SO_3^{(2-)}$, containing a sulfur atom bound to three oxygen atoms, with a net −2 charge. Sulfites may be bound to cations such as sodium, potassium, or others.

"Sulfoxidation" may refer to a reaction or conversion, whether or not catalytic, that produces organo-sulfoxide, organo-sulfone, organo-sulfonate, or organo-sulfonic acid compounds (and/or mixtures thereof) from organosulfur compounds.

"TAN" refers to a Total Acid Number expressed as milligrams ("mg") of KOH per gram ("g") of sample. TAN may be determined by ASTM Method D664 or an equivalent method thereof. The TAN is a measurement of acidity that is determined by the amount of potassium hydroxide in milligrams that is needed to neutralize the acids in one gram of oil. It is an important quality measurement of crude oil.

The TAN value indicates to the crude oil refinery the potential of corrosion problems. It is usually the naphthenic acids in the crude oil that cause corrosion problems.

"Total base number (TBN)" is a measure of a petroleum product's reserve alkalinity. It is measured in milligrams of potassium hydroxide per gram (mg KOH/g). TBN determines how effective the control of acids formed will be during the combustion process. The higher the TBN, the more effective it is in suspending wear-causing contaminants and reducing the corrosive effects of acids and acidic byproducts over an extended period of time. TBN may be determined using ASTM D2896 or an equivalent method thereof.

Reaction systems and methods for removing heteroatoms from oxidized-heteroatom-containing hydrocarbon streams and low-heteroatom containing hydrocarbon products derived therefrom are disclosed. An oxidized-heteroatom-rich hydrocarbon feed, such as, for example, one provided by the sulfoxidation method and system disclosed in International Publication Number WO 2009/120238 A1, to Litz et al., may be reacted in the reaction system thereby forming substantially heteroatom free hydrocarbon products that are readily separated from each other by conventional separation methods (i.e. vapor-liquid, liquid-liquid, or adsorption methods). The hydrocarbon products derived from the reaction system and method may be useful as transportation fuels, lubricants, and refinery feeds, refinery intermediates and products. Moreover, previously disclosed methods reducing the content of heteroatoms from hydrocarbon feeds, as well as separation techniques do not completely remove heteroatom containing compounds, or the presence of suspended sulfate and sulfite solids or micro-emulsions increasing the overall density of light phase hydrocarbons. Incomplete separation and removal may also risk buildup and corrosion of downstream processes that may occur beyond heteroatom removal stages. Thus, the disclosure in this application describes methods and systems for increasing the amount of heteroatom-free hydrocarbons that are recovered from an oxidative desulfurization method and reduce the amount of residual heteroatoms, suspended solids and micro-emulsions remaining in the final hydrocarbon product.

In order to provide a reaction system and method for reducing the heteroatom content and increasing API gravity, decreasing TAN of oxidized-heteroatom-containing hydrocarbon feed streams, the reaction system may be preferably heated and comprises a feed inlet region, a reaction region and an outlet region; the reaction region comprises a caustic compound, optionally a mixture of caustic compounds, and optionally supported on an inert metal oxide, and optionally a molten liquid, and optionally a molten mixture; the inlet region may receive the hydrocarbon feed independently or as a mixture comprising a sulfone-rich hydrocarbon and a selectivity promoter that combine to contact with the caustic compound(s); wherein the oxidized-heteroatom-rich hydrocarbons react with the caustic and selectivity promoter producing substantially non-ionic hydrocarbon products that exit via the outlet region with a lower heteroatom content than the feed.

The caustic component operatively positioned in the reaction region of the system of the present disclosure may be any inorganic compounds that may exhibit basic properties which includes, but is not limited to, inorganic oxides from group IA and IIA elements, inorganic hydroxides from group IA and IIA elements, or optionally mixtures of oxides and hydroxides of group IA and IIA elements, molten hydroxides of group IA and IIA elements, or optionally mixtures of hydroxides of said elements. Non-limiting examples may include $Li_2O$, $Na_2O$, $K_2O$, $Rb_2O$, $Cs_2O$, $Fr_2O$, BeO, MgO, CaO, SrO, BaO, and the like as well as LiOH, NaOH, KOH, RbOH, CsOH, FrOH, $Be(OH)_2$, $Mg(OH)_2$, $Ca(OH)_2$, $Sr(OH)_2$, $Ba(OH)_2$, green liquor, and the like, and their mixtures or molten mixtures thereof.

Optional support components of the reaction region of the reaction system of the present disclosure may be any inorganic oxide, inert or active, such as, for example, a porous support such as talc or inorganic oxides.

Suitable inorganic oxides may be oxides of elements of groups 2, 3, 4, 5, 13, 14, 15 and 16 of the Periodic Table of the Elements. Examples of oxides preferred as supports include silicon dioxide, aluminum oxide and also mixed oxides of the two elements and corresponding oxide mixtures. Other inorganic oxides which may be used alone or in combination with the abovementioned preferred oxide supports may be, for example, MgO, $ZrO_2$, $TiO_2$ or CaO, to name only a few.

The support materials used may have a specific surface area in the range from 10 to 1000 m2/g, a pore volume in the range from 0.1 to 5 ml/g and a mean particle size of from 0.1 to 10 cm. Preference may be given to supports having a specific surface area in the range from 0.5 to 500 m2/g, a pore volume in the range from 0.5 to 3.5 ml/g and a mean particle size in the range from 0.5 to 3 cm. Particular preference may be given to supports having a specific surface area in the range from 200 to 400 m2/g, and a pore volume in the range from 0.8 to 3.0 ml/g.

The selectivity promoter may be an organic alcohol, ROH, wherein R is a C1-C18 alkyl-, aryl-, or alkenyl-group, that produces non-ionic hydrocarbon product from the oxidized-heteroatom feed. The hydrocarbon product may be substantially insoluble in the molten caustic and exits the outlet region and may be preferred to a reaction system not containing a selectivity promoter because the reaction products without the promoter tend to be organic hydroxides which are substantially in the ionic form in severely caustic environments and thus may be more challenging to separate from the caustic without considerable expense. The selectivity promoter may be presently more preferably an alcohol, a diol, or a polyol and mixtures thereof. Non limiting examples include, but are not limited to: methanol, benzyl alcohol, ethylene glycol, propylene glycol, glycerol, pinacol, 1,3-propanediol and the like that may produce non-ionic product from the oxidized-heteroatom feed. Presently more preferred selectivity promoters fall into the class of compounds referred to as vicinal diols, which may have hydroxyl groups bound to adjacent carbon atoms, or the class of alcohols known as primary alcohols, where the hydroxyl group is bound to a carbon atom, that carbon atom being bound to at most one other carbon atom. Presently most preferred may be ethylene glycol or methanol. The non-ionic hydrocarbon product may be substantially insoluble and/or inert to the caustic and exits the outlet region and may be more preferred to a reaction system containing ionic products.

FIG. 1 illustrates how the selectivity of the reaction of the present disclosure is improved to form more valuable products. Dibenzothiophene sulfone was chosen as a model sulfur compound because most of the sulfur in an average diesel fuel is in the form of substituted or unsubstituted dibenzothiophene. Equation (1) illustrates how hydroxide attacks the sulfur atom of dibenzothiophene sulfone (A), forming biphenyl-2-sulfonate (B). Equation (2) illustrates how hydroxide may attack B at the carbon atom adjacent to the sulfur atom, forming biphenyl-2-ol (C) and sulfite salts (D). Compound C may ionize in basic media, and may dissolve in the aqueous or molten salt layer. Equation (3) illustrates how hydroxide may attack the sulfur atom of B to form biphenyl (E) and sulfate salts (F). Equation (4) illustrates how, in the presence of a primary alcohol, including, but not limited to, methanol, methoxide ions generated in-situ may attack the carbon atom, forming ether compounds, such as 2-methoxybiphenyl (G). Equation (5) illustrates the reaction of dibenzothiophene sulfone with alkoxides alone, not in the presence of hydroxide, as taught by Aida et al, to form biphenyl-2-methoxy-2'-sulfinate salt (H), which may be substantially soluble in the caustic. Using aqueous or molten hydroxide without the presently disclosed selectivity promoter will cause reaction (1) to occur, followed predominantly by reaction (2).

In an embodiment wherein a vicinal diol selectivity promoter disclosed herein is used, reaction (1) may occur. In some embodiments, the reaction (1) may be followed by reaction (3), or reaction (6) may occur, forming a biphenyl-2-sulfinate salt (I), which may be further followed by reaction (7) as shown in FIG. 1. In alternative embodiments where the selectivity promoter is a primary alcohol, such as those disclosed herein, is used, reaction (1) may occur, followed by reaction (4). It can be seen that the hydrogen atoms that become attached to biphenyl come from hydroxide and water. When water is used in the regeneration of the caustic, the ultimate source of the hydrogen atoms added to the biphenyl may be water.

Figure 2:
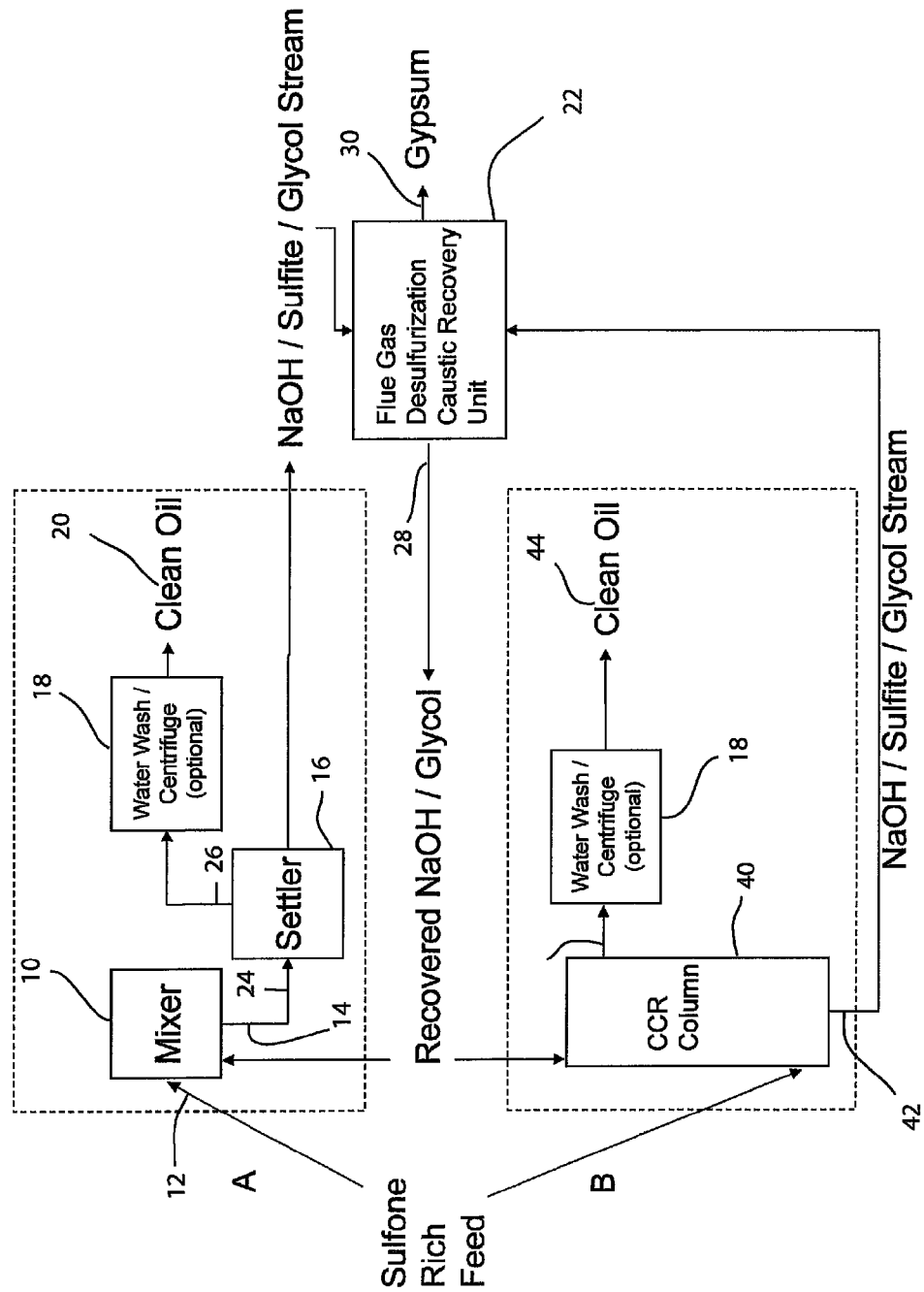
FIG. 2 depicts a schematic view of an embodiment of a method for reducing the heteroatom content of a heteroatom containing hydrocarbon feed.

Two representative embodiments of a plurality of possible representative embodiments of the systems and methods for removing contaminants from hydrocarbon streams and feed contaminated products derived therefrom are shown in FIG. 2. Both systems and methods may begin with a heteroatom-contaminated hydrocarbon feed to be subjected to treatment in order to meet current and future environmental standards. In one representative system and method, an oxidized-heteroatom-containing hydrocarbon feed may be provided through the line A to a mixing vessel 10 through a feed inlet where the contaminated feed may be combined with a caustic and a selectivity promoter where it is allowed to react in the mixing vessel 10 to decontaminate the contaminated feed. The reacting combination may be preferably heated generally in a range of temperature from 50-450 C at a pressure from 0-800 psi.

The mixing vessel 10 may comprise a feed inlet 12, a reaction mixture comprising an oxidized-heteroatom-containing hydrocarbon streams, caustic, glycol, and reaction intermediates and products, an outlet 14 operatively connected to a settler vessel 16, where the cleaned oil (substantially non-ionic hydrocarbon products having a heteroatom content less than the oxidized-heteroatom-containing hydrocarbon feed streams) may be optionally water washed and/or centrifuged 18 to produce a substantially heteroatom-free hydrocarbon product 20. The settled caustic and selectivity promoter can be removed by gravity settling from the bottom of settler vessel 16 to a flue gas desulfurization/caustic recovery unit 22. The recovered caustic and selectivity promoter are then sent back to the mixer vessel 10 to allow for a continuous decontamination reaction process. The settler vessel 16 may comprise a feed inlet 24 from the mixer 10, a clean oil outlet 26 to an optional water wash/centrifuge 18 and then to a clean oil recovery location (not shown) and a caustic/selectivity promoter outlet which may be operatively connected to a flue gas desulfurization caustic recovery unit 22. The flue gas desulfurization caustic recovery unit 22 may comprise a recovered caustic/selectivity promoter outlet 28 which is operatively connected to the mixer 10 for transporting recovered caustic/selectivity promoter from the flue gas desulfurization caustic recovery unit 22 to the mixer 10, providing the continuous process mentioned above. The flue gas desulfurization caustic recovery unit 22 may also comprise a gypsum outlet 30 for transporting gypsum to a gypsum storage or distribution unit (not shown).

In a second representative method and system a oxidized-heteroatom-containing hydrocarbon feed stream may be provided through the line B to a continuous countercurrent reaction column (CCR column) 40, at the top of such column, a recovered caustic and selectivity promoter stream are fed thereto the two streams contact each other in a countercurrent fashion and the selectivity promoter, caustic and sulfite exit through an outlet 42 in the bottom of the column 40 and are transported to a flue gas desulfurization caustic recovery unit 22, where the caustic and the selectivity promoter are regenerated and recovered. The cleaned oil 44 exits from the top of the countercurrent recovery column where it may be optionally washed with water and centrifuged to produce a substantially heteroatom-free hydrocarbon product.

In both the systems and methods, route A, where employing a mixer/settler and route B employing a countercurrent reaction column, generate a used caustic/selectivity promoter stream that exits to the flue gas desulfurization caustic recovery unit 22 to produce a regenerated caustic and selectivity promoter stream that is recycled to the initial stage of the systems and methods and a gypsum by-product containing the heteroatoms previously residing in the untreated feed stream.

EXAMPLES

In order to demonstrate the significant benefit of the present disclosure, examples of the systems and methods of the present disclosure were performed. For comparative purposes, several control reactions were performed. The reaction vessel consisted of a stainless steel Parr type reactor vessel. The reactor was charged with an oxidized-heteroatom-rich hydrocarbon feed and heated to a temperature of 275 C at constant feed rate. The products were analyzed for heteroatom content.

Example 1

A stainless steel (type 316) Parr-type pressure reactor with a volume of 1000 mL was charged with 29 grams of a 1:1 by moles mixture of sodium hydroxide and potassium hydroxide, 11 grams of dibenzothiophene sulfone, and 202 grams of 1,2,3,4-tetrahydronaphthalene. The vessel was heated under rapid stirring to 300° C. The reactor was held at this temperature for 60 minutes, during which the pressure rose to a maximum of 150 psi, then removed from heat and allowed to cool without stirring. 200 grams of liquid were decanted from the reactor, and 41 grams of solids remained. The tetralin layer was analyzed by HPLC. The solids were acidified by adding 125 mL of 5.0M HCl. Vigorous bubbling of released sulfur dioxide from the neutralization of sulfites occurred, confirmed by a sulfur dioxide detector. Dichloromethane was added to extract organics, which was then evaporated, leaving a light brown oil, which was analyzed by HPLC. It was found that >99% of the dibenzothiophene sulfone was converted, to the following products: orthophenylphenol (56%), biphenyl (21%), dibenzofuran (4%), and dibenzothiophene (4%), for a total sulfur-free yield of 81%. The yield of all organics was 95%.

Examples 2-4

The experiment of EXAMPLE 1 was repeated three times, except that the temperature was 275° C. The average results were: 94.5% conversion of dibenzothiophene sulfone, to the following products: ortho-phenylphenol (58%), biphenyl (9%), and dibenzofuran (5%). No dibenzothiophene was detected (<1%). The total sulfur-free yield was 73%. The average yield of all organics was 97%.

Example 5

The experiment of EXAMPLE 2 was repeated except that 20 grams of methanol was added to the reactor with the other reactants. The pressure rose to 350 psi during the reaction. It was found that 92% of the dibenzothiophene sulfone had been converted to the following products: 2-methoxybiphenyl (40%), ortho-phenylphenol (30%), biphenyl (6%), and dibenzofuran (3%). No dibenzothiophene was detected (<1%). The total sulfur-free yield was 79%, with 49% being non-ionizable products. In addition, sulfur dioxide was detected after the run when the pressure was vented, before any acid had been added. The yield of all organics was 97%, not including methanol, which was washed away in the acid workup.

Example 6

The experiment of EXAMPLE 2 was repeated except that 45 grams of tert-butanol was added. The results were similar to those of EXAMPLE 2, and the expected tert-butyl ether was not detected. Sulfur dioxide was detected just after the run cooled. The yield of all organics was 92%.

Example 7

The experiment of EXAMPLE 5 was repeated except that 33 grams of sodium methoxide was added to the reactor with the other reactants. The results were similar to those of EXAMPLE 5.

Example 8

The experiment of EXAMPLE 5 was repeated except that the 29 grams of 1:1 molar sodium hydroxide/potassium hydroxide mixture were omitted, and 33 grams of sodium methoxide (which contains some sodium hydroxide as impurity) was added. The results were analyzed by GC-MS, which showed that conversion of dibenzothiophene sulfone was only ~80%, and that the major product formed was ortho-phenylphenol, followed by 2-methoxybiphenyl and biphenyl. Sulfur dioxide was detected immediately after the run cooled. The yield of all organics was 90%.

Example 9

The experiment of EXAMPLE 5 was repeated except that the reaction was held at temperature for 90 minutes. The results were similar to those of EXAMPLE 5. The yield of all organics was 95%.

Example 10

The experiment of EXAMPLE 5 was repeated except that 60 grams of methanol was used. The pressure rose to 750 psi during the reaction. It was found that 94% of the dibenzothiophene sulfone had been converted, to the following products: ortho-phenylphenol (54%), dibenzofuran (10%), 2-methoxybiphenyl (9%), and biphenyl (8%). No dibenzothiophene was detected (<1%). Total sulfur-free yield was 81%. Sulfur dioxide was detected just after the run cooled. The yield of all organics was 100%, not counting methanol.

Example 11

The experiment of EXAMPLE 5 was repeated except that 87 grams of the 1:1 by moles mixture of sodium hydroxide and potassium hydroxide was used. It was found that 97% of the dibenzothiophene sulfone was converted. The product distribution was similar to that of EXAMPLE 5. The yield of all organics was 91%.

Example 12

The experiment of EXAMPLE 2 was repeated except that 48 grams of phenol were added to the reactor along with the other reactants. The pressure reached 200 psi during the run. No sulfur dioxide was detected after the run, nor was any detected when the solids were acidified with HCl. The products were analyzed by GC-MS, which did not detect any dibenzothiophene sulfone. The major products were ortho-phenylphenol and dibenzothiophene. The yield of all organics was 96%.

Example 13

The experiment of EXAMPLE 1 was repeated except that the reactor was held at temperature for 120 minutes. The results were similar to EXAMPLE 1. The oil layer was decanted from the reactor, and 200 grams of methanol was added to the solids. These were sealed and stirred together at 60° C. for 5 hours. A sample of this product was extracted with dichloromethane and water, and the dichloromethane layer was analyzed by GC-MS. Only a trace of 2-methoxybiphenyl was detected.

Example 14

The experiment of EXAMPLE 2 was repeated except that 40 grams of dicyclopentadiene was added to the reactor with the other reagents. The sample was analyzed by GC-MS, which showed a large number of different products, including a substantial amount of dibenzothiophene.

Example 15

The 1 L pressure reactor was charged with 200 grams of ethanol, 2.4 grams magnesium turnings, and 11 grams dibenzothiophene sulfone. The mixture was stirred at room temperature for 60 minutes. The product was analyzed as-is by GC-MS. Approximately 25% of the dibenzothiophene sulfone had been converted, and the only product was dibenzothiophene.

Example 16

The experiment of EXAMPLE 5 was repeated except that only 10 grams of methanol was added to the reactor with the other reagents. The product was worked up similar to EXAMPLE 1. It was found that 97% of the dibenzothiophene had been converted, to the following products: ortho-phenylphenol (15%), dibenzofuran (2%), 2-methoxybiphenyl (47%), and biphenyl (8%), dibenzothiophene (2%). Total sulfur-free yield was 72%. Sulfur dioxide was detected just after the run cooled. The yield of all organics was 97%, not counting methanol.

Example 17

A 1 L Parr pressure reactor was charged with 200 grams of tetralin, 12 grams sodium hydroxide, 17 grams potassium hydroxide, 11 grams dibenzothiophene sulfone, and 28 grams ethylene glycol. The reactor was purged with nitrogen prior to the run, until no oxygen could be detected on an oxygen sensor (<0.1%). The reactor was sealed and heated to 275° C. for one hour. The product was worked up by the procedure in EXAMPLE 1. However, no sulfur dioxide was detected after the run, or during the acidification. Also, very few bubbles formed during the acidification step. It was found that 100% of the dibenzothiophene sulfone had been converted, to the following products: biphenyl (>75%), ortho-phenylphenol (<25%). The total sulfur-free yield was 100%. The yield of all organics was 97%, not counting ethylene glycol, which was washed away in the acid workup.

Example 18

The experiment of EXAMPLE 17 was repeated except that in place of tetralin and dibenzothiophene sulfone, 100 grams of an oxidized-heteroatom-containing diesel stream with ~2000 ppm sulfur in the form of sulfones was used. In addition, 1.5 grams sodium hydroxide, 2.2 grams potassium hydroxide, and 3.2 grams ethylene glycol were added. The oil product was washed with water and dried, then analyzed for sulfur content by XRF. The process was repeated a total of three times. The sulfur content of the fuel was significantly reduced, to less than 430 ppm S. The nitrogen content was decreased by at least 85%, and the total acid number was decreased below measurable concentrations, at least a 60% decrease.

Example 19

The experiment of EXAMPLE 18 was repeated except that a bitumen stream containing ~4% sulfur was used in place of a diesel. The sulfur content after the reaction was significantly reduced, to less than 1.75% wt sulfur.

Example 20

A stainless steel 1 L Parr-type reactor was charged with 100 grams of an oxidized-heteroatom-containing 2.75% wt sulfur bitumen oil, 21 grams sodium hydroxide, 29 grams potassium hydroxide, and 64 grams ethylene glycol. The reactor was purged with nitrogen, then heated to 275 degrees C. and held at that temperature for 1 hour, then cooled. The oil was washed with water to remove caustic and ethylene glycol until the pH of the water wash was below 8.5, then dried. The sulfur content after the reaction was at most 1% sulfur, vanadium content had been reduced from 175 ppm to less than 65 ppm, and nickel content had been reduced from 67 ppm to below 33 ppm.

Prophetic Example 1

A stainless steel (type 316) Parr-type pressure reactor with a volume of 1000 mL is charged with about 11 grams of dibenzothiophene sulfone, about 202 grams of 1,2,3,4-tetrahydronaphthalene, about 24 g of benzyl alcohol and about 5.7 g of potassium hydroxide. The vessel is heated under rapid stirring to 195° C. The reactor is held at this temperature for about 60 minutes, and then it is removed from the heat and allowed to cool without stirring. About 210 grams of liquid are decanted from the reactor, and about 8 grams of solids remain. The tetralin layer is analyzed by HPLC. The solids are acidified by adding about 25 mL of about 5.0M HCl. Sulfur dioxide is released as the neutralization of sulfites occurs. Dichloromethane is added to extract organics, which are then evaporated, leaving an oil, which is analyzed by HPLC. The conversion of dibenzothiophene sulfone is at least as good as that presented in EXAMPLE 5 with a similar product distribution: 2-benzyloxy-biphenyl (about 40%), ortho-phenylphenol (about 30%), biphenyl (about 6%), and dibenzofuran (about 3%).

Prophetic Example 2

A stainless steel (type 316) Parr-type pressure reactor with a volume of 1000 mL is charged with about 200 grams of bitumen oil having a sulfur content of 2% wt, 15 grams sodium hydroxide, 21 grams potassium hydroxide, and 35 grams ethylene glycol. The vessel is heated under rapid stirring to 275° C. The reactor is held at this temperature for about 60 minutes, and then it is removed from the heat and allowed to cool without stirring. About 200 grams of liquid are decanted from the reactor, and about 70 grams of solids remain. The removal of sulfur and metals is at least as good as that presented in EXAMPLE 18 and EXAMPLE 20. Sulfur content is decreased to less than 1% wt, nitrogen and metals content is decreased by more than 50%. The API gravity of the feed is increased by at least 5 units.

The results of the above examples are illustrated in the following table 1.

| EXAMPLE # | % Conversion | 2-methoxybiphenyl | ortho-phenylphenol | biphenyl | dibenzofuran | dibenzothiophene |
|---|---|---|---|---|---|---|
| 1 | 99% | 0% | 56% | 21% | 4% | 4% |
| 2 | 95% | 0% | 58% | 9% | 5% | 0% |
| 3 | 95% | 0% | 58% | 9% | 5% | 0% |
| 4 | 95% | 0% | 58% | 9% | 5% | 0% |
| 5 | 92% | 40% | 30% | 6% | 3% | 0% |
| 6 | 95% | 0% | 58% | 9% | 5% | 0% |
| 7 | 92% | 40% | 30% | 6% | 3% | 0% |
| 8 | ~80% | | major | | | |
| 9 | 92% | 40% | 30% | 6% | 3% | 0% |
| 10 | 94% | 9% | 54% | 8% | 10% | 0% |
| 11 | 92% | 40% | 30% | 6% | 3% | 0% |
| 12 | N/A | | | | | major |
| 13 | 99% | 0% | 56% | 21% | 4% | 4% |

-continued

| EXAMPLE # | % Conversion | 2-methoxybiphenyl | ortho-phenylphenol | biphenyl | dibenzofuran | dibenzothiophene |
|---|---|---|---|---|---|---|
| 14 | N/A | | | | | major |
| 15 | N/A | | | | | major |
| 16 | 97% | 47% | 15% | 8% | 2% | 2% |
| 17 | 100% | 0% | 25% | 75% | 0% | 0% |

Figure 3:
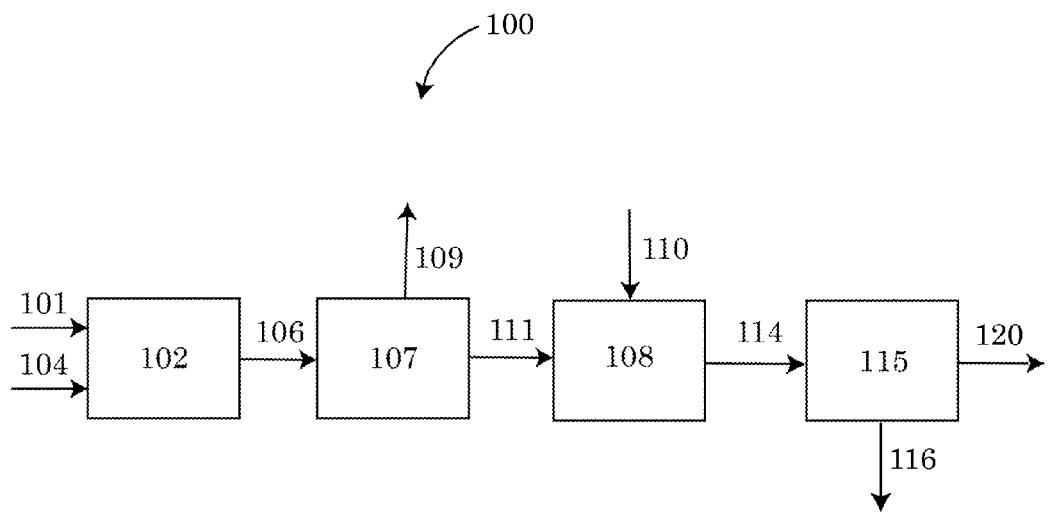
FIG. 3 depicts a schematic view of an alternative embodiment of a method for reducing the heteroatom content of a heteroatom containing hydrocarbon feed.

Referring to FIG. 3, depicting an alternative embodiment 100 of a system and method for reducing heteroatom content of a hydrocarbon feed 101, similar to the methods described above and depicted in FIG. 1, using liquid-liquid extraction techniques described below. The hydrocarbon feed 101 that is being provided, may also be referred to as a heteroatom-containing hydrocarbon feed, or a contaminated hydrocarbon stream. Embodiments of the hydrocarbon feed 101 may include any element in addition to the carbon and hydrogen of the hydrocarbon. Heteroatoms contaminating the hydrocarbon feed may include, but are not limited to compounds containing sulfur, oxygen, nitrogen, nickel, vanadium, iron or other transition metals and combinations of compounds thereof. In some embodiments, the heteroatom containing hydrocarbon feed may contain at least 15 weight parts per million (wppm) vanadium and at least 5 wppm nickel. The heteroatom containing hydrocarbon feed may also contain at least 0.20 Wt. % sulfur, or at least 2 Wt. % sulfur, or at least 4 Wt. % sulfur; and the hydrocarbon-containing feedstock may contain at least 0.01 Wt. % nitrogen, or at least 0.4 Wt. % nitrogen.

Referring still to FIG. 3, the heteroatom-containing hydrocarbon feed 101 may being provided may undergo an oxidation step to convert the heteroatom-containing hydrocarbons of the feed 101 into oxidized heteroatom containing hydrocarbons, such as sulfone and/or sulfoxide containing hydrocarbons. During the oxidation step, the feed 101 may be combined with an oxidant 104 and subjected to an oxidation reaction in a heteroatom oxidizer 102 or an oxidizer vessel.

Embodiments of the oxidation step may be carried out using at least one oxidant, optionally in the presence of a catalyst. Suitable oxidants 104 may include organic peroxides, hydroperoxides, hydrogen peroxide, $O_2$, air, $O_3$, peracetic acid, as well as organic hydroperoxides, which may include benzyl hydroperoxide, ethylbenzene hydroperoxide, tert-butyl hydroperoxide, cumyl hydroperoxide and mixtures thereof. Other suitable oxidants may include sodium hypochlorite, permanganate, biphasic hydrogen peroxide with formic acid, nitrogen containing oxides (e.g. nitrous oxide), and mixtures thereof, with or without additional inert organic solvents.

In an alternative embodiment, the step of oxidation may further include an acid treatment including at least one immiscible acid. The immiscible acid and oxidant treatment may remove a portion of the heteroatom contaminants from the feed 101, wherein upon being oxidized by the immiscible acid and oxidant, the heteroatoms may become soluble in the acid phase, and be subsequently removed via a heteroatom containing by-product stream. The immiscible acid used may be any acid which is insoluble in the hydrocarbon oil phase. Suitable immiscible acids may include, but are not limited to, carboxylic acids, sulfuric acid, hydrochloric acid, and mixtures thereof, with or without varying amounts of water as a diluent. Suitable carboxylic acids may include, but are not limited to, formic acid, acetic acid, propionic acid, butyric acid, lactic acid, benzoic acid, and the like, and mixtures thereof, with or without varying amounts of water as a diluent. Additional types of diluent that may be used or added to the hydrocarbon feed or oxidized heteroatom-containing hydrocarbon feed, with without the presence of the immiscible acids disclosed above, may be any hydrocarbon diluent compatible with the refining process, including butanes, pentanes, hexanes, heptanes, octanes, benzene, toluene, xylene, trimethylbenzenes, ethylbenzene, cumene, or petroleum materials such as naphthas, gasolines, diesels, or other crude oils.

In some embodiments, the oxidation reaction(s) may be carried out at a temperature of approximately 20° C. to about 120° C., at a pressure of about 0.1 atmospheres to about 10 atmospheres, with a contact time of about 2 minutes to about 180 minutes.

An oxidation catalyst, such as those previously describe above may be utilized. The catalyst may be provided and used in the presence of the oxidant 104 in the oxidizing vessel 102. A suitable catalyst may include transition metals including but not limited to Ti(IV), V(V), Mo(VI), W(VI), transition metal oxides, including ZnO, Al2O3, CuO, organometallic complexes such as, zeolite, Na2WO4, transition metal aluminates, metal alkoxides, such as those represented by the formula $M_mO_m(OR)_n$, and polymeric formulations thereof, where M is a transition metal such as, for example, titanium, rhenium, tungsten, copper, iron, zinc or other transition metals, R may be a carbon group having at least 3 carbon atoms, where at each occurrence R may individually be a substituted alkyl group containing at least one OH group, a substituted cycloalkyl group containing at least one OH group, a substituted cycloalkylalkyl group containing at least one OH group, a substituted heterocyclyl group containing at least one OH group, or a heterocyclylalkyl containing at least one OH group. The subscripts m and n may each independently be integers between about 1 and about 8. In some embodiments, R may be substituted with halogens such as F, Cl, Br, and I. For example, embodiments of the metal alkoxide catalyst may include bis(glycerol)oxotitanium(IV)), wherein M is Ti, m is 1, n is 2, and R is a glycerol group. Other examples of metal alkoxides include bis(ethyleneglycol)oxotitanium (IV), bis(erythritol)oxotitanium (IV), bis(sorbitol)oxotitanium (IV).

In some embodiments, the oxidation catalyst may further be bound to a support surface. The support surface may include an organic polymer or an inorganic oxide. Suitable inorganic oxides include, but are not limited to, oxides of elements of groups IB, II-A, II-B, III-A, III-B, IV-A, IV-B, V-A, V-B, VI-B, of the Periodic Table of the Elements. Examples of oxides that may be used as a support include copper oxides, silicon dioxide, aluminum oxide, and/or mixed oxides of copper, silicon and aluminum. Other suitable inorganic oxides which may be used alone or in combination with the abovementioned oxide supports may be, for example, MgO, ZrO2, TiO2, CaO and/or mixtures thereof. Other supports may include talc.

The support materials used may have a specific surface area in the range from 10 to 1000 m2/g, a pore volume in the range from 0.1 to 5 ml/g and a mean particle size of from 0.1 to 10 cm. Preference may be given to supports having a specific surface area in the range from 0.5 to 500 m2/g, a pore volume in the range from 0.5 to 3.5 ml/g and a mean particle size in the range from 0.5 to 3 cm. Particular preference may be given to supports having a specific surface area in the range from 200 to 400 m2/g, and a pore volume in the range from 0.8 to 3.0 ml/g.

Referring still to FIG. 3, after subjecting a hydrocarbon stream to oxidation conditions in the heteroatom oxidizer vessel 102, an intermediate stream 106 may be generated containing oxidized forms of the heteroatom containing hydrocarbons present in the feed 101 and byproducts thereof. A hydrocarbon feed 101 containing, for example sulfur-based heteroatom contaminants such as thiophenes, benzothiophenes, dibenzothiophenes and thioethers and others may be converted to a sulfone or sulfoxide rich intermediate stream 106.

In some embodiments, the intermediate stream 106 may be subjected to a distillation step, for example in a distillation column 107. During distillation 107, the oxidized heteroatom containing compounds present in intermediate feed 106, may be separated from the oxidant by-products 109 that were also present in the intermediate feed. The oxidant by-products may be recovered and recycled. As a result of the distillation 107, an oxidized hydrocarbon intermediate stream 111 may be formed including oxidized heteroatom compounds such as sulfones and sulfoxide rich hydrocarbons. The oxidized hydrocarbon intermediate stream 111 may also be referred to as a sulfoxidized intermediate hydrocarbon product.

Figure 6:
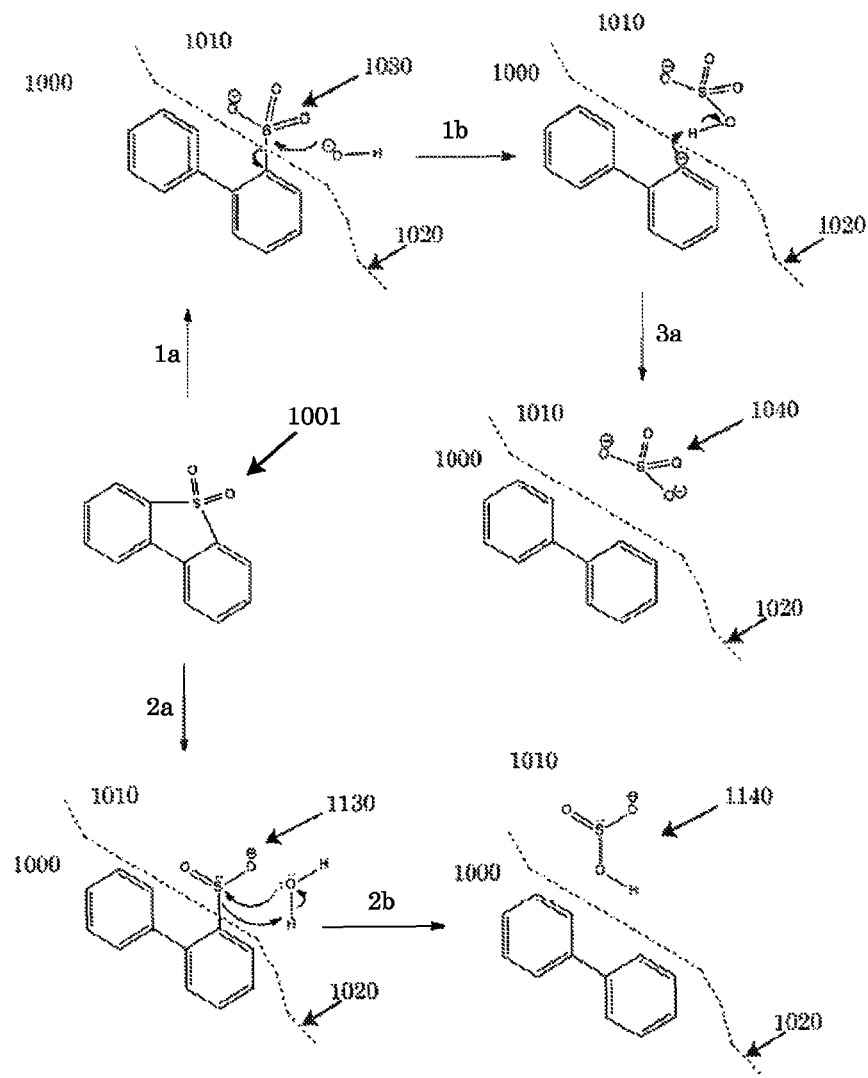
FIG. 6 depicts a schematic view of an embodiment of a biphasic reaction converting a heteroatom containing hydrocarbon into a heteroatom-free hydrocarbon and a heteroatom containing salt.

In some embodiments, the sulfone and/or sulfoxide rich, sulfoxidized intermediate hydrocarbon product 111 may be sent to a reactor vessel 108 such as oil/caustic reactor vessel or promoted caustic visbreaker 108 to undergo a desulfonylation reaction as depicted in the pathways demonstrated in FIG. 1 or reactions mechanisms shown in FIG. 6. In some embodiments, the reactor vessel 108 may be a sulfone management unit.

Once inside the reactor vessel 108, the heteroatom rich stream 111, oxidized heteroatom containing hydrocarbons, which may include sulfones and/or sulfoxides, may be subsequently reacted by contacting the oxidized heteroatom-containing hydrocarbon stream with a caustic treatment solution 110 in an alcoholysis reaction, under biphasic conditions, producing a hydrocarbon phase including a hydrocarbon product and an aqueous phase having at least one of sulfate salts and/or sulfite salts, remaining caustic and selectivity promoter. The caustic treatment solution may comprise mixture of one or more of the following: a caustic, a selectivity promoter, a caustic selectivity promoter and/or a phenol-derived catalyst.

In some embodiments, the reactor vessel 108, such as the oil/caustic reactor vessel or promoted caustic visbreaker may be heated to an elevated temperature between 100° C. and 500° C. with a pressure between 0 and 1000 psi. Suitable caustics which may be present in the caustic treatment solution may include that may be used for the alcoholysis reaction may include compounds that may exhibit basic properties. Caustic compounds may include inorganic oxides having group IA and IIA metals, inorganic hydroxides including group IA and IIA elements, alkali metal sulfides, alkali earth metal sulfides, mixtures and molten mixtures thereof. Non-limiting examples include, but are not limited to, Li2O, Na2O, K2O, Rb2O, Cs2O, Fr2O, BeO, MgO, CaO, SrO, BaO, Na2S, K2S, LiOH, NaOH, KOH, RbOH, CsOH, FrOH, Be(OH)2, Mg(OH)2, Ca(OH)2, Sr(OH)2, Ba(OH)2, green liquor.

In some embodiments, caustic compounds may also include carbonate salts, such as alkali metal carbonates and alkali earth metal carbonates including Na2CO3, K2CO3, CaCO3, MgCO3 and BaCO3; phosphate salts, including alkali metal phosphates, such as sodium pyrophosphate, potassium pyrophosphate, sodium tripolyphosphate and potassium tripolyphosphate; and alkali earth metal phosphates, such as calcium pyrophosphate, magnesium pyrophosphate, barium pyrophosphate, calcium tripolyphosphate, magnesium tripolyphosphate and barium tripolyphosphate; silicate salts, such as, alkali metal silicates, such as sodium silicate and potassium silicate, and alkali earth metal silicates, such as calcium silicate, magnesium silicate and barium silicate, organic alkali compounds expressed by the general formula: R-En $M^m Q^{m-1}$, where R is hydrogen or an organic compound (which may be further substituted) including, but not limited to, straight, branched and cyclic alkyl groups; straight, branched and cyclic alkenyl groups; and aromatic or polycyclic aromatic groups. Further substituents where R is an organic may include hydroxide groups, carbonyl groups, aldehyde groups, ether groups, carboxylic acid and carboxylate groups, phenol or phenolate groups, alkoxide groups, amine groups, imine groups, cyano groups, thiol or thiolate groups, thioether groups, disulfide groups, sulfate groups, and phosphate groups. En– represents an atom with a negative charge (where n=–1, –2, –3, –4 etc.) such as oxygen, sulfur, selenium, tellurium, nitrogen, phosphorus, and carbon; and Mm is any cation (m=+1, +2, +3, +4 etc.), such as a metal ion, including, but not limited to, alkali metals, such as Li, Na, and K, alkali earth metals, such as Mg and Ca, and transition metals, such as Zn, and Cu. When m>+1, Q may be the same as En-R or an atom with a negative charge such as Br—, Cl—, I, or an anionic group that supports the charge balance of the cation $M^m$, including but not limited to, hydroxide, cyanide, cyanate, and carboxylates.

In one embodiment of the present disclosure, the caustic may also be in the molten phase. Molten phase caustics may include previously mentioned caustics as well as eutectic mixtures thereof of two or more caustics. The eutectic mixtures of molten caustics may have a melting point less than 350° C., such as, for example, a 51 mole % NaOH/49 mole % KOH eutectic mixture which may melt at about 170° C.

Referring still to FIG. 3, a selectivity promoter may be introduced to the caustic reaction vessel 108 as part of the treatment solution 110. The selectivity promoter may be any compound capable of being used in the alcoholysis reaction between the caustic and an oxidized heteroatom containing hydrocarbon, to generate biphasic conditions that may promote the formation of non-oxygenated hydrocarbon products 120 and sulfate salts as the major reaction product, although in some embodiments, minor products including sulfite salts may also be formed. Examples of heteroatom-free hydrocarbon products may include non-oxygenated hydrocarbon products 120 including, but not limited to, unsubstituted biphenyl compounds, and aromatic hydrocarbons.

FIG. 1 further illustrates how the selectivity promoter and the biphasic conditions may improve the alcoholysis reaction to form more valuable products. Dibenzothiophene sulfone was chosen as an exemplary sulfur compound because most of the challenging sulfur to treat in diesel fuel is in the form of substituted or unsubstituted dibenzothiophene. Equation (1) illustrates how hydroxide attacks the sulfur atom of dibenzothiophene sulfone (A), forming biphenyl-2-sulfonate (B). Equation (2) illustrates how hydroxide may attack (B) at the carbon atom adjacent to the sulfur atom, forming biphenyl-2-ol (C) and sulfite salts (D). Compound C may ionize in basic media, and may dissolve in the aqueous or molten salt layer. Equation (3) illustrates how hydroxide may attack the sulfur atom of (B) to form biphenyl (E) and sulfate salts (F). Equation (4) illustrates how, in the presence of a primary alcohol, including, but not limited to, methanol, methoxide ions generated in-situ may attack the carbon atom, forming ether compounds, such as 2-methoxybiphenyl (G). Equation (5) illustrates the reaction of dibenzothiophene sulfone with alkoxides alone, not in the presence of hydroxide to form biphenyl-2-methoxy-2'-sulfinate salt (H), which may be substantially soluble in the polar caustic phase.

Using aqueous or molten caustic without the presently disclosed selectivity promoter may cause reaction (1) to occur, followed predominantly by reaction (2). When a selectivity promoter disclosed herein is used, reaction (1) occurs, followed predominantly by reaction (3). Without being confined to any particular theory, it is believed that the biphasic conditions may assist in promoting the selective nucleophilic attack at the Sulfur. When the selectivity promoter (such as an alcohol) disclosed herein is used, reaction (1) occurs, followed predominantly by reaction (3) under biphasic conditions. It can be seen that the hydrogen atoms that become attached to biphenyl may come from hydroxide. When water is used in the regeneration of the caustic, the ultimate source of the hydrogen atoms added to the biphenyl may be water.

In some embodiments, the selectivity promoter may be referred to by other names including polar protic solvent, desulfonylation catalyst or phase transfer catalyst. Selectivity promoters suitable for promoting substantially non-oxygenated hydrocarbon reaction products may include organic alcohols, morpholine, dioxane, dimethylethanolamine, methyldiethanolamine, monoethanolamine, diethanolamine, triethanolamine, N-acetylglucosamine, glucosamine, crown ethers (18-crown-6, 15-crown-5), piperazine, choline hydroxide, benzyltrimethylammonium hydroxide, ethylene glycol, propylene glycol, glycerin, sugars, starches, cellulose, chitin, pectin, chitosan, hyaluronic acid, lignin, diethylene glycol, triethylene glycol, polyethylene glycol, sulfides, hydrosulfides, polysulfides, hydroxide, cyanide, ammonia, anionic amides, halides, acetates, naphthenates, alkoxides, selenides, hydroselenides, tellurides, hydrotellurides, carboranes, phosphorous oxyanions, nitrogen oxyanions, aluminates, borates, carbonates, chromates, silicates, vanadates, titanates and a combination thereof. Embodiments may include introducing an excess molar ratio of selectivity promoters to caustic cations for increased conversion and selectivity.

In some embodiments, the caustic treatment solution may further include one or more catalysts derived from one or more phenolic compounds. These phenolic-derived catalysts present in the caustic treatment solution may be selected from various classes of compounds including, but not limited to, novolac resins, resol resins, calixarenes, lignin, siloxy phenols, Black liquor and a combination thereof.

Figure 4A:
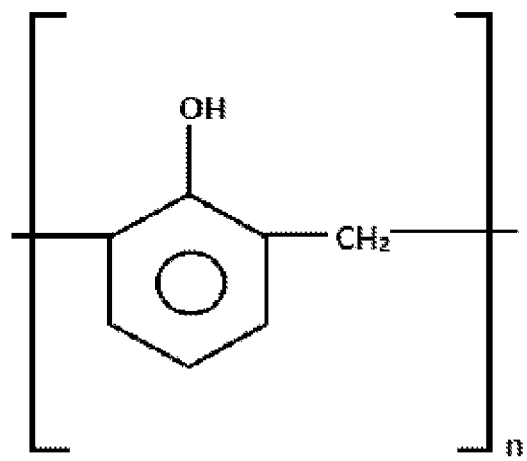
FIG. 4a depicts an embodiment of a generic formula of phenol-derived catalyst, specifically a generic novolac resin.

Referring to FIG. 4a, the novolac resin which may be present in the caustic treatment solution as a phenol derived catalyst may be any novolac resin following the general formula shown. Characteristics of a novolac resin include the presence of two or more phenols linked together by $CH_2$ groups. This general pattern of linking phenol groups together via $CH_2$ linkages may occur "n" number of times.

In the exemplary embodiment, the novolac resins may be phenolic resins having repeating subunits of phenol and formaldehyde. In some embodiments, the novolac resin desired may be a compound wherein n may be between 1-200 or more. For example, n may be $\geq 1$, $n \geq 2$, $n \geq 5$, $n \geq 10$, $n \geq 20$, $n \geq 30$, $n \geq 50$, $n \geq 75$, $n \geq 100$, $n \geq 150$, or $n \geq 200$.

Figure 4B:
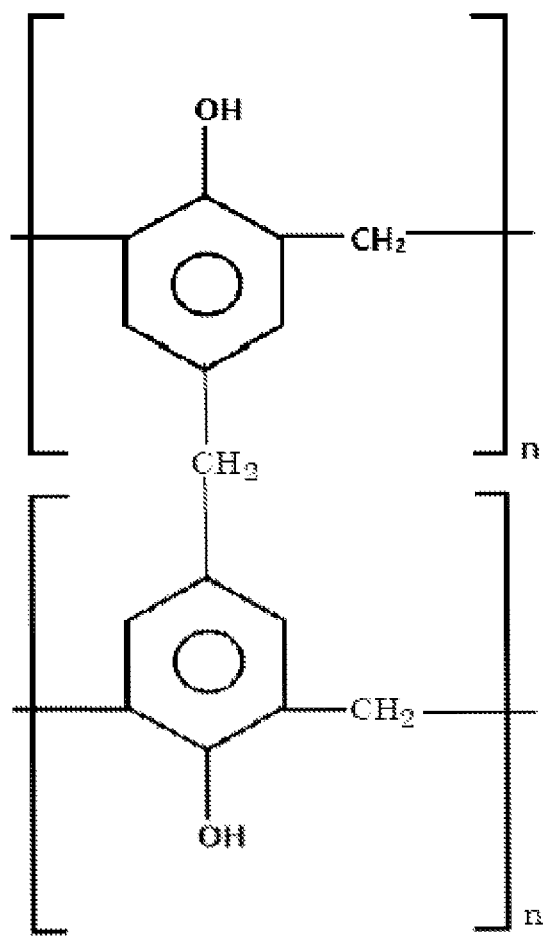
FIG. 4b depicts an alternative embodiment of a phenol-derived catalyst, specifically, a generic formula of a phenol-formaldehyde resol.

In alternative embodiments, the phenol-derived catalyst may be resol. FIG. 4b depicts a general structure for a phenol-formaldehyde resol. Similar to the novolac resin, the resol may also include phenols groups linked to one another via $CH_2$ linkages. This variation of monomers may occur n number times. In addition to the "n" repeating monomers, which follow the structure of a novolac, as described above, the resols may further contain $CH_2$ cross linkages to additional phenolic groups which may be further linked together by one or more $CH_2$ groups. To simplify, a resol may be considered to be multiple novolac resins crosslinked with $CH_2$ to one or more additional novolac compounds. The cross linked novolac structure that forms the resol may occur as a repeating monomeric subunit that may repeat n' number of times, where n' may be less than or equal to n. Embodiments of resol monomer that are crosslinked may repeat n' number of times, where n' is a value between 1-200 or more. For example, n' may be $\geq 1$, $n' \geq 2$, $n' \geq 5$, $n' \geq 10$, $n' \geq 20$, $n' \geq 30$, $n' \geq 50$, $n' \geq 75$, $n' \geq 100$, $n' \geq 150$, or $n' \geq 200$. Both n and n' may be independent of each other and a resol does not necessarily require a cross-linkage between every phenol present in the composition.

Figure 5A:
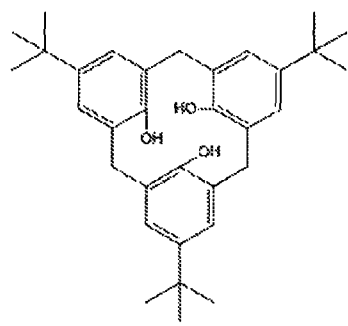
FIG. 5a depicts an alternative embodiment of a phenol-derived catalyst, specifically, a p-tert-butylcalix[3]arene.
Figure 5B:
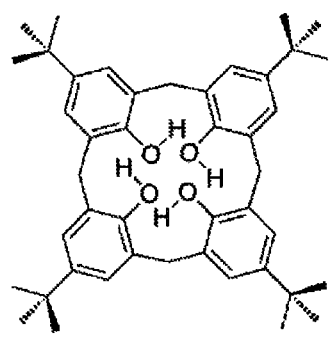
FIG. 5b depicts an alternative embodiment of a phenol-derived catalyst, specifically a p-tert-butylcalix[4]arene.
Figure 5C:
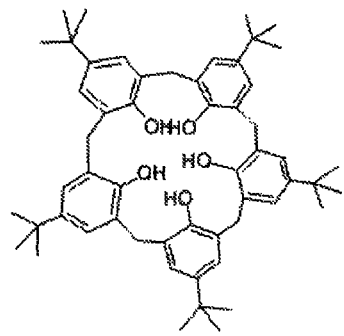
FIG. 5c depicts an alternative embodiment of a phenol-derived catalyst, specifically a p-tert-butylcalix[5]arene.

Embodiments of the phenol-derived catalyst are not limited to resols and novolacs. Another class of phenol-derived catalysts that may be included in the caustic treatment solution 110 are the calixarenes. Calixarenes include phenol groups organized and bound to one another in a manner that results in a ring structure. FIGS. 5a-5c provide examples of calixarenes. Generally the calixarene portion may be written as calix[n]arene, wherein n is the number of phenols forming the ring structure. For example, n may equal 3 to 30 phenols. In some embodiments, n may be >3, >4, >5, >6, >7, >8, >9, >10, >15, >20, >30 phenols in a calixarene. As seen in FIGS. 5a, 5b and 5c, the calixarenes depicted may have three, four or five phenol groups arranged in the ring-like structure, as shown accordingly. In some embodiments, the calixarene may be a tert-butyl calixarene, or more specifically a p-tert-butylcalix[n]arene, where n denotes the number of phenol groups and is approximately 3 to 30.

Figure 8:
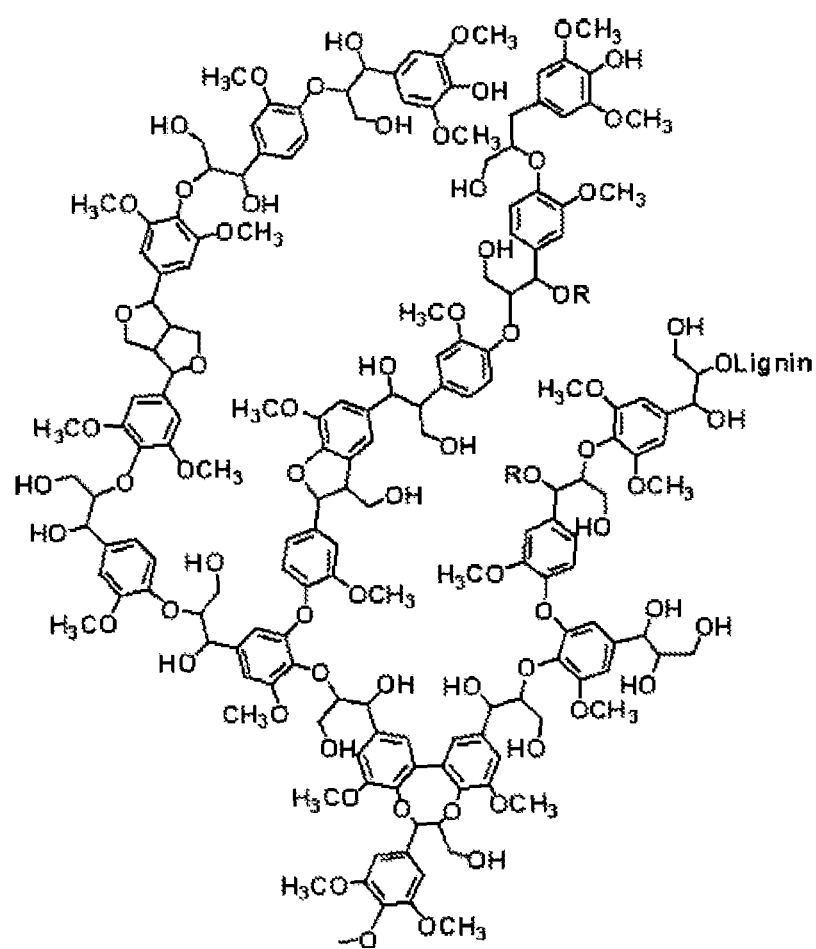
FIG. 8 depicts an alternative embodiment of a phenol-derived catalyst, specifically, an exemplary lignin catalyst.

In other embodiments, the phenol derived catalyst may be a biochemical catalyst having a phenolic structure. For example, one possible biochemical class of agent that may be used are lignins. Lignins are complex polymers that may include aromatic alcohols such as monolignols. The lignin class of complex polymers are best known for their properties in the cell walls of plants and algae. There are many possible bonding patterns for lignin chemical structures. FIG. 8 depicts an example of a lignin with the most commonly exhibited bonding types and patterns.

In some alternative embodiments, the phenol-derived catalyst may be a solid catalyst containing silicon. This silicon containing catalyst may be provided in the caustic reaction vessel 108 separately from the caustic treatment solution 110 in some embodiments. Examples of a solid phenol-derived catalyst which may contain silicon, are the class of siloxyl phenols. More specifically, the composition 4-(3-triethoxysilyl)propyl)phenol (TESPP) or a polymer derived from TESPP may be used.

In some alternative embodiments, as mentioned above, the phenol derived catalyst may be Black liquor. In some embodiments, the black liquor may contain multiple substances in the mixture, including but not limited to an aqueous solution of lignin residues and hemicellulose, hemicellulose fragments, sodium sulfide, sodium hydroxide, sodium carbonate, sodium sulfate, and soaps such as aliphatic carboxylic acid soaps. For example, in some embodiments, the Black liquor may comprise 30-50% soap, 30-50% lignin, 10-20% organic compositions such as cellulose, arabinose, galactose, glucose, xylose and mannose, and 10-30% inorganic salts.

Referring to FIG. 3, the caustic treatment solution 110 may comprise at least one caustic, at least one phenol-derived catalyst and the at least one selectivity promoter. The at least one caustic, at least one phenol-derived catalyst and at least one selectivity promoters may be different components in some embodiments. In another embodiment, the at least one caustic and the at least one selectivity promoter may be the same component. When the at least one caustic and the at least one selectivity promoter are the same component, they may be referred to as a caustic selectivity promoter. Moreover, a suitable caustic selectivity promoter may possess the properties of both the at least one caustic and the at least one selectivity promoter. That is, combinations of caustics with selectivity promoters may react (in situ or a priori) to form a caustic selectivity promoter which has the properties of both a caustic and a selectivity promoter. In another embodiment, the at least one caustic and the at least one phenol-derived catalyst may be the same component. In another embodiment, the at least one caustic and the at least one phenol-derived catalyst and the at least one selectivity promoter may be the same component.

The molar ratio of caustic to selectivity promoter in the caustic treatment solution 110 may be in the range of from about 100:1 to about 1:100. In some embodiments, the mole ratio of caustic to selectivity promoter is in the range of from about 70:1-1:70, 50:1-1:50, 25:1-1:25, 1:10, 10:1, 1-5-5:1, 3:1 to about 1:3 or from about 2:1 to about 1:2.

Generally, the molar ratio of caustic, selectivity promoter and phenol-derived catalyst to heteroatom in the heteroatom-containing hydrocarbon feed oil 111 may be in the range of from about 100:1 to about 1:1. In some embodiments, the molar ratio of caustic, phenol-derived catalyst and selectivity promoter to heteroatom in the heteroatom-containing hydrocarbon feed oil may be in the range of about 10:1 to about 1:1, and in alternative embodiments, the molar ratio of caustic, phenol-derived catalyst and selectivity promoter to heteroatom in the heteroatom-containing hydrocarbon feed oil may be from about 3:1 to about 1:1.

Referring to FIG. 6, depicting an embodiment of the reaction mechanism which may take place within the reactor vessel 108, between the oxidized heteroatom-containing hydrocarbon stream 111 and the caustic treatment solution 110. The mechanism depicted in the figure describes a mechanism for performing desulfonylation of the oxidized heteroatom containing hydrocarbon, which is exemplified using a sulfone 1001. However in other embodiments, the oxidized heteroatom-containing hydrocarbon being acted upon may also be a sulfoxide or thiosulfinate hydrocarbon. In some embodiments, the sulfone may react with the caustic treatment solution 110 and follow reaction path 1a, 2a and 3a to ultimately produce heteroatom free hydrocarbon, such as a biphenyl and a sulfate salt 1040. In other embodiments, the reaction pathway may follow path 1b and 2b, ultimately forming a heteroatom free hydrocarbon and a sulfite salt. Embodiments of the proposed method may follow each of these reaction pathways within the same vessel.

Each of these proposed reaction pathways may occur inside reactor vessel 108 which has received the oxidized heteroatom rich stream 111, and may include sulfones and/or sulfoxides. Each of the reaction paths starting at 1a or 1b, may be performed under biphasic conditions 1000, 1010 in the presence of a caustic, selectivity promoter and/or a phenol derived catalyst. Under the biphasic conditions of the oil/caustic reactor vessel or promoted caustic visbreaker 108, one of the phases may be a polar phase 1010 such as an organic alcohol or any other selectivity promoter previously described. The other phase may be a non-polar phase 1000, which may include non-polar oil or hydrocarbon rich molecules. The boundary between the two phases is delineated by a phase boundary 1020. The phase boundary may further be a liquid-liquid phase boundary or a liquid-solid phase boundary.

As depicted in FIG. 6, the sulfone may react with the caustic treatment solution 110 to form a sulfonate intermediate 1030 according to pathway 1a. Subsequently, hydroxide present in the caustic treatment solution may perform a hydroxyl attack on the C—S bond of the sulfonate intermediate 1030, present in the sulfone/sulfoxide rich oxidized heteroatom containing stream. The intermediate sulfonate 1030, may align its polar sulfonate group into the more preferable polar phase 1010, while the aromatic hydrocarbon portion of the intermediate 1030 prefers the non-polar phase 1000. As a result of the nucleophilic attack, the sulfonate portion may form a sulfate 1040, a good leaving group. The sulfate 1040 may remain in the polar phase 1010 and the hydrocarbon left behind may remain in the non-polar phase of an intermediate stream 114. The separate phases allow for the hydrocarbon products 120 of the non-polar phase to be removed and separated from the heteroatom containing byproducts 116 such as sulfates in separating vessel 115.

Alternatively, reaction 1b may also occur in the caustic reactor vessel 108. According to reaction 1b, the sulfone rich hydrocarbons present in the oxidized hydrocarbon rich stream 111, may be converted into hydrocarbon containing a sulfinate salt 1130 in the presence of a caustic treatment solution 110. Similar to the sulfonate group 1030, the sulfinate 1130 prefers to extend itself into the polar phase 1010 when under biphasic conditions, whereas the hydrocarbon portion prefers the organic phase 1000. The intermediate sulfinate 1130 may further be hydrolyzed resulting in the sulfinate 1130 forming a bisulfite 1040 or sulfite good leaving group. Accordingly the bisulfite or sulfite may release from the hydrocarbon into the polar phase 1010, while the sulfur-free hydrocarbon may continue to reside in the organic non-polar phase of the biphasic system. The divergence of the hydrocarbon and the sulfite/bisulfite reaction products into separate phases allow for easier separation of the hydrocarbon products 120 of the non-polar phase from the heteroatom containing byproducts 116 such as sulfates, sulfites, caustic, selectivity promoter, phenol-derived catalyst and catalyst by-products, in separating vessel 115.

In an alternative embodiment of reaction pathway depicted in FIG. 6, the reaction may be paused or stopped after reaction 1a or 1b is performed and the sulfonate or sulfinate intermediate is present. Reactions 1a or 1b may be controlled in such a fashion by performing the treatment of the oxidized heteroatom containing hydrocarbon (such as sulfone 1001) with the caustic treatment solution at a lower temperature or for a decreased duration of time. For example, in some embodiments, the reaction may be restricted to reaction 1a and/or 1b without further continuing on to reaction 2a and/or 2b in the instance where the caustic treatment solution is introduced into the caustic reactor, contacting with the oxidized heteroatom-containing hydrocarbon, at a temperature ≤250° C. and/or allowing for a reaction time ≤90 minutes. For instance, as described in the examples provided below, the sulfinated hydrocarbon intermediate 1130 may be obtained under milder reaction conditions wherein the contacting temperature is ≤250° C., ≤240° C., ≤230° C., ≤220° C., ≤200° C. Moreover, the reaction pathway 1b may cease continuing the reaction once the sulfinated intermediate is achieved, when the contact time between the caustic treatment solution and the oxidized hydrocarbon is ≤90 min., ≤80 mins, ≤70 mins or ≤60 mins. As a result of the contacting at a temperature ≤250° C. and/or a residence time ≤90 mins, an intermediate selected from the group consisting of a hydrocarbon-containing sulfinate intermediate, a hydrocarbon-containing sulfonate intermediate and a combination of intermediates thereof may be produced.

Subsequently, a cleaner final hydrocarbon product may be achieved by separating from the sulfinated intermediate 1130 or sulfonated intermediate, from the remaining caustic, selectivity promoter and phenol derived catalyst via gravity separation. Moreover, in some embodiments, the sulfinated intermediate or sulfonated intermediate left behind after the removal of the caustic treatment solution and its byproducts, may be further converted to sulfur free hydrocarbon and a sulfate, sulfite or bisulfite salt by simply hydrolyzing the sulfinated or sulfonated intermediate with water to produce a hydrocarbon product having a heteroatom content that is less than the heteroatom content of the oxidized heteroatom-containing hydrocarbon feed.

Referring back to FIG. 3, the phases 1000, 1010, resulting from the contact of the caustic treatment solution 110 with the oxidized heteroatom feed 111, a biphasic intermediate 114 may be produced having a light phase (non-polar phase 1000) containing the hydrocarbon products 120 having a heteroatom content that is less than the heteroatom content of the oxidized heteroatom-containing hydrocarbon feed or the initial hydrocarbon feed 101, and a dense phase (1010) comprising of the caustic, selectivity promoter, caustic containing byproducts, phenol-derived catalyst.

This intermediate stream 114 may be further sent to a settler vessel 115 for separating the hydrocarbon phase containing hydrocarbon products aqueous phase (polar phase). Inside the settler vessel 115, separation of the polar phase consisting of a caustic, from the light oil phase may be performed using gravity or other suitable separation methods. These separation methods may separate, extract and remove the light phase hydrocarbon products 120 from the remaining polar phase 116, allowing for the hydrocarbon products 120 to have less heteroatom contaminants present that the hydrocarbon feed 101 or the oxidized heteroatom containing feed 111. In some embodiments, the settler vessel 115 may be a gravity settler, a centrifuge or a electrostatic enhanced separator.

In some embodiments of the system and method described above, the hydrocarbon product 120, removed from the settler vessel 115 may undergo further washing steps to remove the remaining caustic, caustic by products, sulfate salts, sulfite salts or bisulfate salts that may have entered the light phase during the treatment with the caustic treatment solution or that may have failed to be separated in the settler vessel 115. The additional wash method may further reduce the presence of heteroatoms, such as sulfates and sulfites, in the hydrocarbon products by further separating and removing them from the heteroatom free hydrocarbons. The wash steps, as described below, may be particularly suitable for reducing sulfate and sulfite salts that may be present in the hydrocarbon products 115 as suspended solids or micro-emulsions, forming during the alkaline mediated desulfonylation contacting step between the caustic treatment solution and the hydrocarbon inside the reactor vessel 115. The wash steps described below may be performed in a batch-wise fashion, or in some embodiments, the wash steps may be run continuously. This additional removal of residual heteroatom contaminants and salts may be needed to place the final hydrocarbon products within the prescribed specifications for transportation and further refinement.

Figure 7:
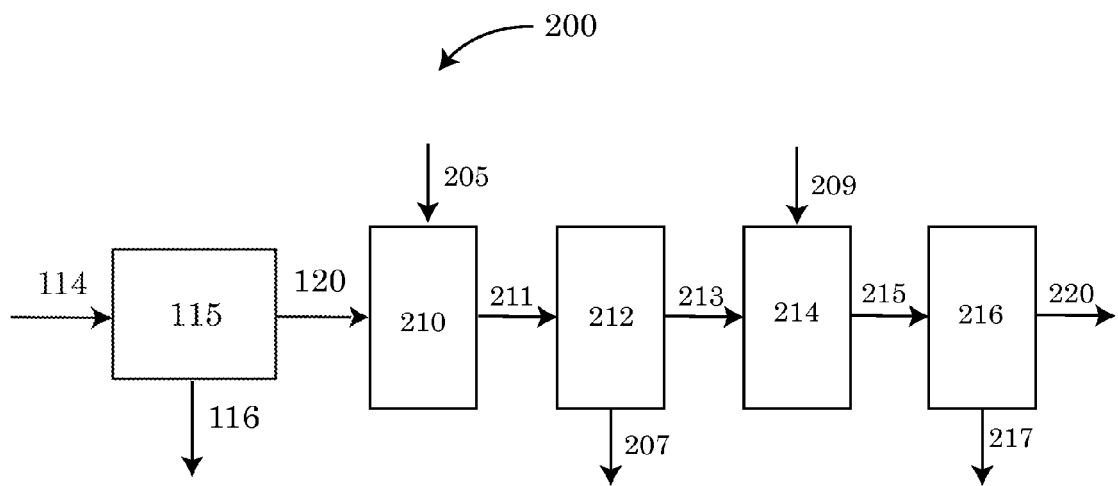
FIG. 7 depicts a schematic view of alternative embodiment of the method of FIG. 2, comprising additional steps, further reducing the heteroatom content of the hydrocarbon product.

Referring to FIG. 7, which provides a schematic overview of the washing procedure, including the steps of removing the suspended solids or micro-emulsions of sulfate salts, sulfite salts and caustic by-products from the hydrocarbon phase, containing the hydrocarbon product 120. Additional washing steps may be used to purify the hydrocarbon phase, decrease the density and TBN of the hydrocarbon phase, simplify the extraction of remaining heteroatoms, such as sulfate salts, sulfite salts, and heavy phase residue contaminants as well as further simplifying subsequent phase separation of the hydrocarbon phase and the heavy phase (aqueous/polar phase).

Embodiments of the wash method may first include a step of transporting the hydrocarbon products 120, comprising the hydrocarbon phase present in the caustic reactor 115, which has been separated from the non-polar phase 1010, to a mixing vessel 210. In some embodiments, the mixing vessel may be a static mixer, while in other embodiments, the mixing vessel 210 may be a mixing valve, stirred apparatus or a centrifugal pump. With the non-polar phase and its caustic byproducts 116 separated and removed, the hydrocarbon products may be mixed with an aqueous wash feed 205 inside the mixing vessel 210.

In some embodiments, the aqueous wash feed may be supplied into the mixing vessel 210 through a separate input than the input receiving the hydrocarbon products. Embodiments of the aqueous wash feed 205 may include a solution of sodium hydrogen sulfate dissolved in water. The concentrations of the sodium hydrogen sulfate (sodium bisulfate) may vary from application to application. The amount of wash solution must be considered when undergoing the washing step. If the concentration of sodium bisulfate is too low, the wash solution may fail to perform the neutralization reaction with the residual heteroatoms remaining in the hydrocarbon product. However, if the concentration of the sodium bisulfate in the aqueous wash feed 205 is too high, this may result in the formation of additional, unintended by-products. Embodiments of the aqueous wash feed 205 may have a sodium bisulfate concentration between approximately 5-50% by weight of the aqueous wash feed 205. For example in some embodiments, the aqueous wash feed may have a concentration of sodium bisulfite that is 6%, 10%, 15%, 20%, 25%, 30%, 40% or 50%. In other embodiments, the aqueous wash feed may have a concentration ≤50%, ≤40%, ≤30%, ≤20%, ≤10%, or ≤5% by weight.

Embodiment of the aqueous wash feed entering the mixing vessel 210 may be supplied to the vessel 210 in a controlled manner and thus contact the contaminated hydrocarbon product 120 such that the total moles of acid are between 30-75% of the total moles of base present in the contaminated hydrocarbon. For example, in some embodiments, the total moles of acid may be greater than 30% of the total moles of base present in the contaminated hydrocarbon products 120, while in other embodiments the total moles of acid may be ≥40%, ≥50%, ≥60% or ≥70% of the total moles of base. The residence time inside the mixing vessel may be as little as 5 minutes in some embodiments, or the hydrocarbon product may remain in contact with the aqueous wash feed for 15 minutes or more in other embodiments.

The step of mixing the hydrocarbon phase containing the hydrocarbon product 120, with the aqueous wash feed 205 may produce biphasic system comprising a washed hydrocarbon phase 213 and an aqueous wash phase 207. The aqueous wash phase 207 may include the components of the aqueous wash feed (water and sodium bisulfate), as well as the contaminants removed from the hydrocarbon phase, including sodium sulfate, sodium sulfite, sodium phenoxide, selectivity promoters such as organic alcohols and diols, as well as caustic by-products. Embodiments of this mixing step occurring in mixing vessel 210 may occur at a temperature between 80-120° C. and at a pressure between 100-130 psig. In other embodiments, the temperature may be 90° C., 95° C., 100° C., 105° C., 110° C. or 115° C. Embodiments of the pressure may be 100 psig, 105 psig, 110 psig, 115 pisg, 120 psig or 130 psig. Moreover, the stirring rate within the mixing vessel 210 may be 100-300 RPM.

Embodiments of the wash method may include the step of removing the mixed stream 211 containing the washed hydrocarbon phase 213 and aqueous wash phase 207 from the mixing vessel and transporting the mixed stream to a settling vessel 212. This transporting step may occur by flowing the mixed stream 211 from the mixing vessel 210 to the settling vessel 212 in some embodiments. Embodiments of the settling vessel receiving the mixed stream 211 may be a gravity separator, which may include internal coalescing aids such as a grid or packed material. In other embodiments the settling vessel 212 may be a centrifuge or an electrostatic-enhanced gravity separator, which may or may not contain coalescing aids.

Once the mixed stream 211 is inside the settling vessel, the washed hydrocarbon phase may be extracted from the aqueous wash phase 207. The step of separating the washed hydrocarbon phase from the aqueous wash phase may occur by gravity in some embodiments. In other embodiments, additional separation-aiding additives may be supplied or fed into the settling vessel 212. These separation additives may decrease the overall time it takes for the mixed stream 211 to separate into two distinct phases, having a phase boundary between the washed hydrocarbon phase and the aqueous wash phase. Suitable separation additives may include any known demulsifiers, including but not limited to nonylphenol ethoxylates and similar compounds, and quaternary ammonium salts such as tetra-n-butyl ammonium hydroxide.

In some embodiments, separating and extracting the aqueous wash phase from the washed hydrocarbon phase may be further improved by applying an electric voltage to the mixed stream 211, inducing separation more quickly, and reducing settling time. In some embodiments, the electric voltage may be supplied via electrodes inserted within settler vessel 212. In other embodiments, the settler vessel may be built with electrodes included therein. These electrodes may be separated by different distances depending on the size of the vessel and the amount of the electric voltage provided. In the exemplary embodiment, the electrodes were spaced approximately 1.5 inches apart, and were immersed in the hydrocarbon phase.

Embodiments using electric voltage to aid the separation of the two phases in the mixed stream 211 may apply an alternating current (AC) having a frequency around 60 Hz. This alternating current may be between 15 milliamps (mA) and 200 mA or more in some embodiments. Voltages between 350 v-1500 v or higher may be used. In other embodiments, the voltage applied may be ≤2000V, ≤1500V, ≤1200V, ≤1000V, ≤800V, ≤600V, ≤500V, or ≤350V. Higher voltages may be used to further decrease separation time. In embodiments where an electrical voltage is applied, separation of the washed hydrocarbon phase and the aqueous wash phase may occur in as little as 30-120 minutes or less. In the exemplary embodiments, 90 minutes was typically observed as being sufficient. It should also be noted that determining the appropriate voltage, may depend on the resistance of the hydrocarbon phase 213. In particular, the resistance provided by the hydrocarbon phase may vary depending on the water and salt content of the hydrocarbon phase 213 in the separation vessel 212. For example, as the salt and water content decreases, resistance will increase. The resistance observed during the experiments disclosed herein varied between 3500 ohms to 100,000 ohms.

Once the separation between washed hydrocarbon phase 213 and the aqueous wash phase 207 is completed, the aqueous wash phase may be removed from the settler vessel 212. Accordingly, in some embodiments, the washed hydrocarbon phase may undergo a second or subsequent washing step as described below, by mixing the washed hydrocarbon phase with a second aqueous wash feed, producing a final hydrocarbon product having a sulfite salt concentration or sulfate salt concentration that is less than the sulfite salt concentration or sulfite salt concentration of the hydrocarbon product. Subsequent to washing with the second aqueous wash phase the step of extracting the final hydrocarbon product from the second aqueous wash phase may be performed.

An example of an embodiment having a secondary wash step is depicted in FIG. 7. The secondary washing step may vary slightly from the previous wash step described. In such an embodiment, the washed hydrocarbon phase may flow or be transported to a second mixing vessel 214. The second mixing vessel may be any type of mixing vessel previously described as suitable for mixing vessel 212. Similar to the mixing vessel 212, the mixing vessel 214 may receive a second aqueous wash feed 209 which may enter the mixing vessel 214 and contact the washed hydrocarbon phase 213, forming a second mixed stream 215 comprised of a final hydrocarbon product 220 and a second aqueous wash phase 217.

Embodiments of the second aqueous wash phase 209 may be comprised of a salt dissolved in water. In some embodiments, the salt may be sodium chloride. Similar to the concentration of the first aqueous wash feed 205, the concentration of the salt, such as sodium chloride, in the second aqueous wash feed may also vary depending on the application and the contents of the second mixing vessel 214. The concentration of the salt may be provided in a concentration, such that the density of the second aqueous wash phase 209 is greater than the density of the hydrocarbon phase. For example, in some embodiments, the concentration of salt may be between approximately 1-50% by weight. In some embodiments, the salt may comprise a cation, selected from the group consisting of an alkali metal, alkaline earth metal, and organic heterocyclic-cations, and mixtures thereof, and wherein the salt has an anion consisting of one or more halogens, sulfite, sulfate and a combination thereof.

In some embodiments, the second aqueous wash feed may further comprise tetra-n-butyl ammonium hydroxide (TBAH). The concentration of TBAH may vary from embodiment to embodiment, however, the concentration may be between 0.005-0.2% by weight (50-2000 ppm).

Embodiment of the second aqueous wash feed 209 may be fed to the second mixing vessel 214 in a controlled manner, to allow for the necessary amount to mix with the washed hydrocarbon phase 213. In the exemplary embodiment, the ratio of second aqueous wash feed 209 provided to the second mixing vessel 214 may be equal in mass to the washed hydrocarbon phase 213 present in the second mixing vessel 214. This ratio may vary however. For example, the ratio of the second aqueous wash feed to washed hydrocarbon phase 213 may be a ratio between 1:3-3:1, including the ratios of 1:2, 1:1.9, 1:1.7, 1:1.5, 1:1.2, 1:1, 1.2:1, 1.5:1, 1.7:1, 1.9:1, 2:1.

The step of mixing the washed hydrocarbon phase 213, with the second aqueous wash feed 209 may produce biphasic system comprising a final hydrocarbon product 220 phase and a second aqueous wash phase 217. The second aqueous wash phase 217 may include the components of the aqueous wash feed (water and salt, such as sodium chloride), as well as the contaminants removed from the washed hydrocarbon phase, including sodium sulfate, sodium sulfite, sodium bisulfite, sodium phenoxide, TBAH, selectivity promoters such as organic alcohols and diols, as well as caustic by-products. Embodiments of this mixing step occurring in mixing vessel 214 may occur at a temperature between 80-120° C. and at a pressure between 100-130 psig. In other embodiments, the temperature may be 90° C., 95° C., 100° C., 105° C., 110° C. or 115° C. Embodiments of the pressure may be 100 psig, 105 psig, 110 psig, 115 pisg, 120 psig or 130 psig. Moreover, the stirring rate within the mixing vessel 210 may be 100-300 RPM.

As a result of the contact between the second aqueous wash feed and the washed hydrocarbon phase 213, a second mixed stream 215 may be formed wherein the mixed stream comprises a non-polar, organic phase having a final hydrocarbon product, and a second aqueous wash phase 217 including water, sodium chloride, sodium sulfate, sodium bisulfate, sodium hydrogen sulfate, sodium phenoxide, sodium sulfite, hydrogen sulfite, TBAH, any other ingredients that may be present in the caustic residue such as the selectivity promoter, alcohols or other caustic byproducts.

In some embodiments of the wash method, the final hydrocarbon product 220 may be extracted from the second aqueous wash phase 217, in a manner similar to the separation of the washed aqueous hydrocarbon phase 213 from the aqueous wash feed 207. Similar to the extraction from the wash feed described above, the second mixed feed 215 may flow or be transported to a second separation vessel 216. The second separation vessel 216 may have the same properties and configurations as the separation vessel 212 described above. In particular, the second mixing vessel may be a gravity separator (with or without coalescing aids provided as a grid or packing material), a centrifuge or an electrostatic-enhanced gravity separator (with or without coalescing aids) in some embodiments.

Once the second mixed stream 215 is inside the second settling vessel 216, the final hydrocarbon product phase 220 may be extracted from the second aqueous wash phase 217. The step of separating the final hydrocarbon product 220 phase from the second aqueous wash phase 217, may occur by gravity in some embodiments. In other embodiments, additional separation aiding additives may be supplied or fed into the settling vessel 216. These separation additives may decrease the overall time it takes for the mixed stream 215 to separate into two distinct phases, having a phase boundary between the final hydrocarbon product phase and the second aqueous wash phase. Suitable separation additives may include any known demulsifiers, including but not limited to nonylphenol ethoxylates and similar compounds, as well as quaternary ammonium salts such as tetra-n-butyl ammonium hydroxide.

In some embodiments, separating the second aqueous wash phase from the final hydrocarbon product phase may be further improved by applying an electric voltage to the second mixed stream 215, inducing separation more quickly. In some embodiments, the electric voltage may be supplied via electrodes inserted within the second settler vessel 216. In other embodiments, the second settler vessel 216 may be built with electrodes included therein. These electrodes may be separated by different distances depending on the size of the vessel and the amount of the electric voltage being provided. In the exemplary embodiment, the electrodes were spaced approximately 1.5 inches apart, and were immersed in the hydrocarbon phase.

Embodiments using electric voltage to aid the separation of the two phases in the second mixed stream 215 may apply an alternating current (AC) having a frequency around 60 Hz. This alternating current may be between 15 milliamps (mA) and 200 mA or more in some embodiments. Voltages between 350 v-1500 v or higher may be used. In other embodiments, the voltage applied may be ≤2000V, ≤1500V, ≤1200V, ≤1000V, ≤800V, ≤600V, ≤500V, or ≤350V. Higher voltages may be used to further decrease separation time. In embodiments where an electrical voltage is applied, separation of the washed hydrocarbon phase and the aqueous wash phase may occur in as little as 30-120 minutes or less. In the exemplary embodiment 90 minutes or less was typically observed as being sufficient. It should also be noted that determining the appropriate voltage, may depend on the resistance of the hydrocarbon phase 220. In particular, the resistance provided by the hydrocarbon phase may vary depending on the water and salt content of the second hydrocarbon phase 220 in the second separation vessel 216. For example, as the salt and water content decreases, resistance will increase. The resistance observed during the experiments disclosed herein varied between 3500 ohms to 100,000 ohms.

Once there is separation between the second aqueous wash phase 217 and the final hydrocarbon product 220, the second aqueous wash phase 217 may be removed from the second settler vessel 216. Embodiments of the final hydrocarbon product 220 may have a decreased heteroatom content that is less than the hydrocarbon feed 101, the hydrocarbon product 120 and the washed hydrocarbon phase 213. Accordingly, the final hydrocarbon product 220 may be collected and transported to another location for further processing and refining.

Unexpectedly, it has been found that the methods and systems for removing heteroatoms have had a significant impact on the sulfate and sulfite content present in the final hydrocarbon products. In some embodiments, the amount of sulfite and sulfate remaining in the final hydrocarbon product has been shown to be reduced from 6.4% by weight in the initial hydrocarbon product, to a level as low as 0.4% by weight in the first wash and separation described in the embodiments above. Moreover, following the embodiments of the methods described above, the final hydrocarbon products have removed more than 98% of residual sulfate and sulfite content after two washes and separations, making the method suitable for use in refinery applications.

Embodiments of the methods and systems described above, and further exemplified below in the plurality of examples provided below, further demonstrate the effectiveness and selectivity of the described method in forming specific hydrocarbon products and final hydrocarbon products having reduced heteroatom content. Embodiments of this method may have high selectivity for specific hydrocarbons including non-oxygenated hydrocarbons such as biphenyls. As demonstrated in the examples above and provided below, the conversion percentage of oxidized heteroatom containing hydrocarbons, including sulfones and sulfoxides may be ≥80%. In some embodiments, the conversion may be 100% conversion rate, while in other embodiments, the conversion rate may be ≥90%, ≥92%, ≥95%, ≥97% or ≥99%.

As shown in table 1 above and tables 2-6 below, the described methods may selectively convert a heteroatom containing hydrocarbon feed or a heteroatom containing oxidized hydrocarbon feed into biphenyl, while limiting the conversion to undesired hydrocarbons such as ortho-phenylphenol, methoxy biphenyl, dibenzofuran and dibenzothiophene. Embodiments of the method may be capable of converting the contaminated feeds into a hydrocarbon product or final hydrocarbon product having a biphenyl content that is ≥10%, ≥25%, ≥35%, ≥40%, ≥50%, ≥60%, ≥70% or ≥75%. The biphenyl content may be between 10-75% of the hydrocarbon product or final hydrocarbon product produced in some embodiments. For example, in some embodiments, ≥20% of heteroatom-containing compounds in the hydrocarbon feed may be converted to non-oxygenated, non-heteroatom-containing hydrocarbon compounds including biphenyls. In other embodiments the conversion may be ≥25%, ≥35%, ≥40%, ≥50%, ≥60%, ≥70% or ≥75%.

Furthermore, the embodiments of methods described herein, may also limit formation of undesirable compounds such as ortho-phenylphenol, methoxybiphenyl, dibenzofuran and dibenzothiophene. Embodiments of the methods described may be capable of selectively limiting the formation of ortho-phenylphenol, methoxybiphenyl, dibenzofuran and dibenzothiophene to ≤50%, ≤40%, ≤30%, ≤25%, ≤20%, ≤10%, ≤5%, ≤3% or 0% of the hydrocarbon products and final hydrocarbon products formed. For example, in some embodiments, ≤50% of heteroatom-containing compounds in the hydrocarbon feed may be converted to oxygenated or heteroatom-containing compounds including methoxy biphenyls, dibenzofurans and dibenzothiophenes and compounds similar to methoxy biphenyls, dibenzofurans and dibenzothiophenes. In other embodiments, the conversion rate to oxygenated or heteroatom-containing compounds may be ≤40%, ≤30%, ≤25%, ≤20%, ≤10%, ≤5%, ≤3% or 0%.

The following examples and experimental data is provided for illustrative purposes. The examples are not intended in any way to limit the disclosure to the specific procedures or materials used in the provided examples below:

Example 21

A commercial phenolic novolac resin from the SI Group, Rezicure 3057, was crushed with a mortar and pestle. The resulting powder (24.9 g, 0.235 mole) was transferred to a Parr pressure reactor, where it was mixed with dibenzothiophene sulfone (DBTSO2) (10.1 g, 0.047 mole), propylene glycol (21.3 g, 0.280 mole), and sodium hydroxide (9.5 g, 0.238 mole). Tetralin (60.0 g, 0.454 mole) was added as solvent. The reactor was sealed and its constituents were mixed at 600 revolutions per minute (RPM) for 90 minutes at 275° C. After completion, the reactor was cooled to room temperature. The result was a biphasic product that was settled by gravity. The top layer consisted of organic compounds such as tetralin, DBTSO2, and reaction products derived from DBTSO2. The heavier bottom layer was mainly caustic. The resin melted during the reaction. A sample was taken from the organic layer and analyzed by High Pressure Liquid Chromatography (HPLC). Results for examples 21-28 are shown in Table 2.

Example 22

A similar experiment as Example 21 was conducted. The commercial phenolic novolac resin, Rezicure 3057, was ground in a coffee grinder until it formed a powder. This powder (53.73 g, 0.507 mole) was blended with hexamethylenetetramine (6.82 g, 0.049 mole). The blended powders were cured in a vacuum oven for 16 hours at 170° C. at −29 in Hg. The resulting dark brown solid was very rigid. A sample of this material (38.24 g, 0.361 mole) was then pretreated with sodium hydroxide by crushing it into smaller pieces and soaking them in a 30% sodium hydroxide solution (15.11 g NaOH, 0.378 mole NaOH). The excess water was filtered out and the remaining resin was dried in a vacuum oven at 110° C. at −29 in Hg. The resulting solid was hard and brittle. This material was crushed into a powder (30.01 g, 0.234 mole) and mixed in a Parr pressure reactor with DBTSO2 (10.1 g, 0.047 mole), propylene glycol (21.72 g, 0.285 mole), and water (4.33 g, 0.240 mole). A reaction was carried out as in example 1. The resulting solid in the caustic layer was a sticky matter that hardened as it cooled to room temperature. Results are shown in Table 2.

Example 23

A phenol-formaldehyde resol was synthesized by reacting phenol with excess formaldehyde in the presence of base. Phenol (30.20 g, 0.321 mole) was mixed with 39.15 g of formalin (14.49 g formaldehyde, 0.482 mole formaldehyde) and sodium hydroxide (12.8 g, 0.320 mole). The mixture was stirred in a beaker for 1 hour at 70° C. The resulting viscous liquid was immediately inserted into a vacuum oven where it was cured at 200° C. for 1 hour. The resulting polymer was a dark reddish solid. The solid was crushed into small pieces by a mortar and pestle and then transferred to a Parr pressure reactor (30.01 g, 0.234 mole). It was mixed with DBTSO2 (10.09 g, 0.047 mole), propylene glycol (21.84 g, 0.287 mole), and water (4.22 g, 0.234 mole). A reaction was carried out as in example 21. The resol remained in solid form. Results are shown in Table 2.

Example 24

The solid remaining from Example 23 was washed with acetone and then dried at 80° C. at −27 in Hg. The solid (38.22 g, 0.299 mole) was washed with a 22% aqueous sodium hydroxide solution (24.00 g NaOH, 0.600 mole NaOH). Excess water was removed by vacuum filtration. This dried polymer (33.33 g, 0.260 mole) was then re-used in the pressure reactor under the same parameters as example 23. Reagents added were DBTSO2 (10.2 g, 0.047 mole), propylene glycol (21.79 g, 0.286 mole), and water (25.28 g, 1.403 mole). After the reaction, there was no solid remaining Results are shown in Table 2.

Example 25

4-(3-(triethoxysilyl)propyl)phenol (TESPP) was synthesized by adding allylphenol (50.0 g, 0.373 mole) drop-wise to triethoxysilane (61.1 g, 0.372 mole) while being stirred slowly at 60° C. in the presence of Karstedt's catalyst (Platinum(0)-1,3-divinyl-1,1,3,3-tetramethyldisiloxane complex solution) (250 μL). The addition took place over the course of 60 minutes. The solution was stirred for another 60 minutes after the last drop of allylphenol was added. A sample (34.9 g, 0.117 mole) of the brownish solution of TESPP was placed in a Parr pressure reactor with DBTSO2 (5.09 g, 0.024 mole), propylene glycol (12.5 g, 0.164 mole), and sodium hydroxide (5.6 g, 0.140 mole). A reaction was carried out as in example 21. A solid was formed during the run. The organic layer was analyzed by HPLC. Results are shown in Table 2.

Example 26

An allylphenol-formaldehyde solid was synthesized by stirring 2-allylphenol (50.23 g, 0.374 mole) and paraformaldehyde (11.30 g, 0.376 mole) in the presence of dodecylbenzenesulfonic acid (1.0 g, 0.003 mole) under a toluene reflux for four hours. A Dean Stark trap was used to remove water from the system. A sample of the resulting light brown solution (188.15 g, 1.287 mole) was mixed with Karstedt's catalyst (Platinum(0)-1,3-divinyl-1,1,3,3-tetramethyldisiloxane complex solution) (475 μL) and poly(methylhydrosiloxane) (3.70 g, 0.062 mole). The solution was stripped of toluene in a rotary evaporator at −28.5 inHg. This slurry was then heated at 150° C. for several hours under nitrogen in order to induce hydrosilylation. The resulting hard solid was broken up by a hammer and coffee grinder until a fine powder was produced. The powder (36.2 g, 0.175 mole) was reacted with DBTSO2 (7.6 g, 0.035 mole), propylene glycol (18.7 g, 0.246 mole), sodium hydroxide (8.5 g, 0.213 mole), and water (7.8 g, 0.433 mole) in a Parr pressure reactor. Tetralin (45.0 g, 0.340 mole) was added as solvent. This reaction was run at 275° C. for 120 minutes at a stir rate of 600 RPM. The allylphenol-formaldehyde solid retained its solid form during the process. Results are shown in Table 2.

Example 27

Example 26 was repeated with one exception. Four times the molar equivalent of solid was added to the Parr pressure reactor. Allylphenol-formaldehyde (109.0 g, 0.528 mole) was added to DBTSO2 (5.8 g, 0.027 mole), sodium hydroxide (6.4 g, 0.160 mole), propylene glycol (14.3 g, 0.188 mole), and water (5.9 g, 0.327 mole). The resulting product was entirely solid. The solid swelled and soaked up all liquid. Results are shown in Table 2.

Example 28

The allylphenol-formaldehyde solid was synthesized in the same manner as Example 26. The solution was stripped of toluene in a rotary evaporator at −28.5 in Hg. Rather than mixing with a siloxane, the slurry was precipitated in hexanes. Vacuum filtration was used to obtain white solids. These solids were cross-linked at 150° C. for several hours. The resulting solids were much less durable than the siloxane-containing version in Example 26. Solids were turned to powder (1.68 g, 0.011 mole) in coffee grinder and transferred to a microwave reactor vial where DBTSO2 (0.50 g, 0.002 mole), propylene glycol (1.23 g, 0.016 mole), sodium hydroxide (0.59 g, 0.015 mole), and water (0.27 g, 0.015 mole) were added. Results are shown in Table 2.

TABLE 2

| Example | Mole Percent of DBTSO2 Converted to Biphenyl (%) |
|---|---|
| Example 21 | 58.3% |
| Example 22 | 48.9% |
| Example 23 | 49.1% |
| Example 24 | 73.7% |
| Example 25 | 9.9% |
| Example 26 | 26.4% |
| Example 27 | 2.7% |
| Example 28 | 54.0% |

Example 29

A mixture of p-tert-butylcalix[n]arene isomers with varying ring sizes, where n denotes the number of phenol groups present in the ring and may range from 4 to 30, was synthesized using a mixture of p-tert-butylphenol (100.0 g, 0.665 mole), powdered paraformaldehyde (26.0, 0.866 mole) and 50% aqueous sodium hydroxide in water (3.03 g [1.515 g NaOH], 0.0379 mole NaOH) in a mole ratio of 1:1.3:0.6 respectively under reflux in toluene (346.9 g, 3.765 mole). Hexane was added as an anti-solvent to precipitate the white powered p-tert-butylcalix[n]arene mixture which was filtered and dried at −29 InHg at 50° C. for 16 hours. The calixarene solid (12.5 g, 0.077 mole) was mixed with DBTSO2 (3.3 g, 0.0153 mole), sodium hydroxide (NaOH) (3.7 g, 0.0925 mole), and propylene glycol (PG) (8.4 g, 0.110 mole), in a mole ratio of 1:6:5:7 (DBTSO2:NaOH: calixarene solid:PG), in the solvent tetralin (38.6 g, 0.292 mole) and reacted in a 300 mL Parr pressure reactor at 600 rpm and 275° C. for 90 minutes. The contents were allowed to cool to room temperature and analyzed by HPLC. The results are listed in Table 3 as example 29. The percentages listed are the mole percentage of the initial DBTSO2 found in the reaction products.

Example 30

The same desulfonylation reaction as in example 29 was carried out with a mixing speed of 300 rpm. A sample of p-tert-butylcalix[n]arene isomers (10.1 g, 0.0622 mole) was added to reaction vessel containing DBTSO2 (2.7 g, 0.0125 mole), NaOH (3.0 g, 0.075 mole), and PG (6.7 g, 0.0881 mole) using tetralin as the reaction solvent (43.8 g, 0.331 mole). The results are listed in Table 3 as example 30.

Example 31

The same desulfonylation reaction as in example 29 was carried out with a mixing speed of 60 rpm. A sample of p-tert-butylcalix[n]arene isomers (22.2 g, 0.1368 mole) was added to reaction vessel containing DBTSO2 (6.1 g, 0.0282 mole), NaOH (6.4 g, 0.160 mole), and PG (14.8 g, 0.195 mole) using tetralin as the reaction solvent (49.4 g, 0.374 mole). The results are listed in Table 3 as example 31.

Example 32

Same reaction as in example 29 was performed at 250° C. for 90 minutes at a mixing speed of 180 rpm. For this example, DBTSO2 (3.0 g, 0.0139 mole), NaOH (3.4 g, 0.085 mole), p-t-butylcalix[n]arene (11.3 g, 0.0523 mole), and PG (7.4 g, 0.0973 mole) were combined in tetralin (46.7 g, 0.353 mole). The results are listed in Table 3 as example 32.

Example 33

Same reaction as in example 32 except that the powdered calixarenes were made into a glassy solid by heating briefly to 349° C. and then at 9000 psi for 4 hours at 120° C. The pressed calixarene solids (10.7 g, 0.0659 mole) were then added to a reaction vessel containing DBTSO2 (3.2 g, 0.0148 mole), NaOH (3.2 g, 0.0800 mole) and PG (7.4 g, 0.0972 mole) in tetralin (104.8 g, 0.793 mole). The results are listed in Table 3 as example 33.

Example 34

The same desulfonylation reaction as in example 29 was carried out by combining DBTSO2 (5.1 g, 0.0236 mole), NaOH (5.5 g, 0.138 mole), calixarene solid (18.8 g, 0.116 mole), and PG (12.3 g, 0.162 mole) were combined in tetralin (56.3 g, 0.426 mole) and allowing to react at 300° C. for 15 minutes. The results are listed in Table 3 as example 34.

Example 35

The same desulfonylation reaction as in example 29 was carried out by combining DBTSO2 (5.2 g, 0.0254 mole), NaOH (5.5 g, 0.138 mole), calixarene solid (19.4 g, 0.120 mole), and PG (12.6 g, 0.166 mole) were combined in tetralin (78.4 g, 0.593 mole) and allowing to react at 300° C. for 15 minutes, at 300° C. for 30 minutes. The results are listed in Table 3 as example 35.

Example 36

The same desulfonylation reaction as in example 29 was carried out except the reaction mixture was prepared from DBTSO2 (4.4 g, 0.0203 mole), NaOH (2.4 g, 0.060 mole), water (5.6 g, 0.311 mole), calixarene solid (16.5 g, 0.0763 mole) and propylene glycol (10.8 g, 0.142 mole) in a mole ratio of 1:3:15:5:7 respectively. The contents were combined in tetralin (47.8 g, 0.362 mole) and allowed to react at 275° C. for 90 minutes. The results are listed in Table 3 as example 36.

Example 37

The same desulfonylation reaction as in example 36 was performed with sodium carbonate in place of sodium hydroxide. DBTSO2 (6.9 g, 0.0319 mole), Na2CO3 (20.3 g, 0.192 mole), H$_2$O (6.9 g, 0.383 mole), calixarene solid (26.0 g, 0.160 mole), and PG (17.1 g, 0.225 mole) were combined in tetralin (80.5 g, 0.372 mole) and were allowed to react at 290° C. for 90 minutes. The results are listed in Table 3 as example 37.

Example 38 p-tert-butylcalix[4]arene was synthesized following the procedure documented in the literature (Gutsche, C. D.; Iqbal, M. Organic Syntheses; Wiley & Sons: New York, 1990; Collect. Vol. No. 8, pp 75), p-tert-butylphenol, 37% aqueous formaldehyde stabilized with 10-15% methanol, and 10.82N NaOH were combined to make a precursor which was dissolved in diphenyl ether and was refluxed under a gentle nitrogen flow for 4 hours. The mixture was allowed to cool and ethyl acetate was added via an addition funnel to precipitate the solid crude product. The crude product was then filtered, washed and dried under vacuum before being dissolved in boiling toluene. The crystals formed upon cooling were filtered and dried under −29 InHg at 140° C. for 48 hours. These crystals (1.9585 g, 0.0121 mole) were combined with DBTSO2 (0.5213 g, 2.41×10−3 mole), NaOH (0.5716 g, 0.0143 mole), and PG (1.2933 g, 0.0170 mole) with tetralin (7.0105 g, 0.0530 mole) as a solvent for the same desulfonylation reaction as in example 9, except that this reaction was completed on a CEM Discover and Explorer SP Microwave Reactor in a glass tube and was allowed to proceed at 275° C. for 90 minutes with rapid mixing. The results are listed in Table 3 as Example 38.

Example 39 p-tert-butylcalix[6]arene was synthesized following the procedure documented in literature (Gutsche, C. D.; Iqbal, M. Organic Syntheses; Wiley & Sons: New York, 1990; Collect. Vol. No. 8, pp 77). The resulting crystalized solid was used in a desulfonylation reaction as in example 18. The crystals (1.9512 g, 0.0120 mole) were combined with DBTSO2 (0.5240 g, 2.42×10-3), NaOH (0.5759 g, 0.0144 mole), PG (1.3116 g, 0.0172 mole) in tetralin (7.0186 g, 0.0531 mole) as a solvent and allowed to react in the same way as example 38. The results are listed in Table 3 as example 39.

Example 40 p-tert-butylcalix[8]arene was synthesized following the procedure documented in literature (Gutsche, C. D.; Iqbal, M. Organic Syntheses; Wiley & Sons: New York, 1990; Collect. Vol. No. 8, pp 80). The resulting crystallized solid was used in a desulfonylation reaction as outlined in example 18. The crystals (1.9691 g, 0.0121 mole) were combined with DBTSO2 (0.5236 g, 2.42×10-3), NaOH (0.5929 g, 0.0148 mole), PG (1.2842 g, 0.0169 mole) in tetralin (7.0226 g, 0.0531 mole) as a solvent and allowed to react in the same way as example 19. The results are listed in Table 3 as example 40.

TABLE 3

| Example | DBTSO2 | Biphenyl |
| --- | --- | --- |
| Example 29 | 1.84% | 61.41% |
| Example 30 | 0.00% | 69.39% |
| Example 31 | 2.02% | 72.09% |
| Example 32 | 1.73% | 32.19% |
| Example 33 | 11.79% | 20.68% |
| Example 34 | 0.00% | 73.34% |
| Example 35 | 0.00% | 70.26% |
| Example 36 | 37.72% | 29.01% |
| Example 37 | 27.28% | 7.59% |
| Example 38 | 8.00% | 53.64% |
| Example 39 | 30.84% | 33.46% |
| Example 40 | 5.71% | 68.11% |

Example 41

The following was added to a 160 mL 316 stainless steel Parr reactor to model a sulfur containing crude oil stream: sodium benzene sulfinate (7.8 g, 0.047 mol) and tetralin (60.0 g, 0.455 mol). Water (4.2 g, 0.233 mol) was also added to the reactor. The reactor was sealed, purged with nitrogen and heated to 300° C. The mixture was stirred at 600 RPM for 60 minutes, after which it was cooled to below 25° C. and the remaining pressure vented. The oil phase and water phase were separated and analyzed by HPLC. The results are listed in Table 4 as example 41.

Example 42

An experiment was carried out as in example 41, but propylene glycol (24.7 g, 0.325 mol) was added instead of water. The oil and propylene glycol phases were analyzed by HPLC. The results are listed in Table 4 as example 42.

Example 43

An experiment was carried out as in example 41, but propylene glycol (24.7 g, 0.325 mol) was added in addition to water (4.2 g, 0.233 mol). The oil and water/propylene glycol phases were analyzed by HPLC. The results are listed in Table 4 as example 43.

Example 44

An experiment was carried out as in example 41, but sodium benzene sulfinate (3.2 g, 0.019 mol), tetralin (25.0 g, 0.189 mol), phenol (10.0 g, 0.106 mol), sodium hydroxide (6.25 g, 0.156 mol), and water (6.25 g, 0.347 mol) were used. The oil and caustic phases were analyzed by HPLC. The results are listed in Table 4 as example 44.

Example 45

An experiment was carried out as in example 41, but benzene sulfinate (7.8 g, 0.048 mol), tetralin (60.0 g, 0.455 mol), phenol (22.0 g, 0.234 mol), sodium hydroxide (12.75 g, 0.319 mol), water (12.75 g, 0.709 mol) and propylene glycol (24.8 g, 0.326 mol) were added to a 300 mL 316 stainless steel Parr reactor. The oil and caustic phases were analyzed by HPLC. The results are listed in Table 4 as example 45.

Example 46

An experiment was carried out as in example 45, but phenyl sulfone (7.8 g, 0.036 mol) was used instead of benzene sulfinate. The oil and caustic phases were analyzed by HPLC. The results are listed in Table 4 as example 46. In addition, 1.5% of the total moles of phenyl sulfone were converted to sodium benzene sulfinate.

Example 47

An experiment was carried out as in example 41, but sodium hydroxide (6.2 g, 0.155 mol) and potassium hydroxide (8.2 g, 0.146 mol) were added instead of water. The oil and caustic phases were analyzed by HPLC. The results are listed in Table 4 as example 47. In addition, a total of 52.53 mole percent of the initial benzene sulfinate was converted to phenol.

Example 48

An experiment was carried out as in example 41, but nothing was added to the benzene sulfinate and tetralin. The oil was analyzed by HPLC. The results are listed in Table 4 as example 48.

TABLE 4

| Example | Mole Percent of Sodium Benzene Sulfinate (or phenyl sulfone in example 26) converted to Benzene |
|---|---|
| Example 41 | 64.6% |
| Example 42 | 18.7% |
| Example 43 | 26.3% |
| Example 44 | 16.6% |
| Example 45 | 52.5% |
| Example 46 | 147.7% |
| Example 47 | 20.7% |
| Example 48 | 0% |

Example 49

The following was added to a 160 mL 316 stainless steel Parr reactor: DBTSO2 (3.0 g, 0.014 mol), tetralin (18.3 g, 0.138 mol), phenol (6.5 g, 0.069 mol), sodium hydroxide (3.3 g, 0.083 mol), and propylene glycol (7.5 g, 0.099 mol). The reactor was sealed, purged with nitrogen and heated to 250° C. The mixture was stirred at 600 RPM for 120 minutes, after which it was cooled to below 80° C. and the remaining pressure vented. The products were analyzed by HPLC. The results are listed in Table 5 as example 49.

Example 50

An experiment was carried out as in example 49, but sodium lactate (11.0 g, 0.098 mol) was substituted for propylene glycol, and water (3.3 g, 0.183 mol) was also added. The results are listed in Table 5 as example 50.

Example 51

An experiment was carried out as in example 49, but sodium sulfite (8.5 g, 0.067 mol) and water (3.3 g, 0.183 mol) were added as well. The results are listed in Table 5 as example 51.

Example 52

An experiment was carried out as in example 49, but p-tert-butylcalix[n]arenes (mixture of ring sizes) described in example 9 (11.2 g, 0.069 mol) were substituted for phenol. The results are listed in Table 5 as example 52.

Example 53

An experiment was carried out as in example 52, but cellulose (15.7 g, 0.097 mol) was substituted for propylene glycol. The reaction was run for 120 min at 200° C. and the resulting single phase was analyzed by HPLC. The results are listed in Table 5 as example 53.

TABLE 5

| Example | Mole Percent of DBTSO2 Converted to Sodium Biphenyl Sulfinate |
|---|---|
| Example 49 | 44.5% |
| Example 50 | 64.2% |
| Example 51 | 30.8% |
| Example 52 | 66.7% |
| Example 53 | 48.7% |

Example 54

The p-tert-butylcalix[n]arene isomers described in example 29 were recovered by washing with methanol until no more mass loss of the solid was observed. A reaction was performed by adding the isolated calixarene solid (9.8 g, 0.0604 mole) to a reaction mixture with DBTSO2 (2.6 g, 0.120 mole), NaOH (2.9 g, 0.0725 mole), and PG (6.4 g, 0.0841 mole) in tetralin (48.3 g, 0.365 mole) as a solvent. The contents were allowed to mix in a 168 mL Parr pressure reactor at 230° C. and 150 rpm for 90 minutes. The results are listed in Table 6 below under example 54.

Example 55

A similar reaction to the one outline in example 29 was carried out in a CEM Discover Microwave Reactor in a glass tube. In this example, Novolac Rezicure 3057 (1.8430 g, 0.0151 mole) was added to the reaction vessel with DBTSO2 (0.6458 g, 0.00299 mole), NaOH (0.7273 g, 0.0182 mole), and PG (1.6091 g, 0.0211 mole) in tetralin (7.2591 g, 0.0549 mole) as a solvent. The contents were allowed to react at 220° C. with rapid stirring for 3 hours. The results are listed in Table 6 below under example 55.

Example 56

A similar reaction to the one outlined in example 55 was carried out using the same microwave reactor. The Rezicure 3057 (1.8192 g, 0.0149 mole) was added to the reaction vessel with DBTSO2 (0.6469 g, 0.00299 mole), NaOH (0.7405 g, 0.0185 mole), and alkaline lignin (3.8125 g, 0.0212 moles phenol functional groups). The contents were allowed mixed in tetralin (7.2648 g, 0.0550 mole) as a solvent for 2 hours at 240° C. on high mixing. The results are listed in table 6 below under example 56.

Example 57

A similar reaction to the one outlined in example 54 was performed in a 300 mL Parr pressure reactor. In this example, the reaction mixture was prepared from DBTSO2 (10.3 g, 0.0472 mole), NaOH (11.4 g, 0.285 mole), Novolac Rezicure 3057 (28.1 g, 0.230 mole), and PG (25.3 g, 0.333 mole) in tetralin (60.8 g, 0.460 mole) as a solvent. The contents were allowed to mix at 240° C. and 300 rpm for 2 hours. The results are listed below in Table 6 as example 57.

Example 58

A similar reaction to the one outline in example 54 was performed except the calixarene solid synthesized was not used in a reaction beforehand. The solid was heated up to just below its melting point (349° C.) briefly and then pressed in a Carver press at 9000 psi for 4 hours. The resulting glassy solids (10.7 g, 0.0659 mole) were placed in a catalyst basket lined with a stainless steel screen that was attached to the stir shaft on a 300 mL Parr pressure reactor. In the reactor cup DBTSO2 (3.2 g, 0.148 mole), NaOH (3.2 g, 0.0800 mole), and PG (7.4 g, 0.0973 mole) were added to tetralin (104.8 g, 0.793 mole) as a solvent. The contents were allowed to react at 240° C. and 300 rpm for 2 hours. The results are listed below in Table 6 as example 58.

Example 59

A similar reaction to the one outlined in experiment 54 was performed. In this example, the powder calixarene solid (11.3 g, 0.0696 mole) was added to the 300 mL Parr Pressure reactor cup as is with no prior treatment with DBTSO2 (3.0 g, 0.0139 mole), NaOH (3.4 g, 0.0850 mole) and PG (7.4 g, 0.0973 mole). The contents were allowed to mix in tetralin at 240° C. and 100 rpm for 2 hours. The results are listed in table 6 under example 59.

Example 60

A similar reaction to the one outlined in experiment 59 was performed. In this example, the powder calixarene solid (25.5 g, 0.157 mole) was added to the 300 mL Parr Pressure cup with DBTSO2 (6.8 g, 0.0419 mole), NaOH (7.6 g, 0.190 mole) and lignin (39.6 g, 0.220 mole). The contents were allowed to mix in tetralin at 240° C. and 100 rpm for 2 hours. The results are listed below in table 6 under example 60.

Example 61

A similar reaction to the one outline in experiment 59 was performed. In this reaction, DBTSO2 (6.9 g, 0.0319 mole), Na2CO3 (20.3 g, 0.192 mole), H2O (6.9 g, 0.383 mole), calixarene solid (26.0 g, 0.160 mole), and PG (17.1 g, 0.225 mole) was added to tetralin (80.5 g, 0.609 mole). The contents were allowed to mix at 290° C. and 60 rpm for 90 minutes. The results are listed below in table 6 under example 61.

Example 62

A similar reaction to the one outline in experiment 59 was performed. In this reaction, DBTSO2 (10.18 g, 0.047 mole), and concentrated black liquor (86 grams) were added to tetralin (60 g, 0.455 mole). The contents were allowed to mix at 275° C. and 600 rpm for 180 minutes. The results are listed below in table 6 under example 62.

TABLE 6

| | DBTSO2 (mole % of initial DBTSO2) | Sodium biphenyl sulfinate (mole % of initial DBTSO2) |
| --- | --- | --- |
| Example 54 | 0.96% | 63.22% |
| Example 55 | 19.45% | 33.74% |
| Example 56 | 11.79% | 60.88% |
| Example 57 | 8.31% | 61.11% |
| Example 58 | 11.19% | 65.64% |
| Example 59 | 1.73% | 64.48% |
| Example 60 | 55.35% | 37.71% |
| Example 61 | 27.73% | 64.92% |
| Example 62 | 2.85% | 96.56% |

Example 63

A bitumen sample with an initial TBN of 4.5 mg KOH equivalent per gram of oil and an initial TAN of 2.0 mg KOH equivalent per gram of oil was subjected to continuous sulfoxidation and continuous desulfonylation in a manner consistent with this disclosure. The caustic was allowed to settle in a continuous gravity separation vessel. The caustic phase was removed out the bottom of the vessel, while the sulfite and sulfate containing bitumen phase was removed out the top of the vessel. This treated bitumen stream contained 4.4% wt sodium sulfite, 1.7% wt sodium sulfate, and 5.2% wt caustic components. This treated bitumen was subjected to a batch wash procedure. This treated bitumen (252.3 g) was added to a one liter glass liner. The TBN of this oil was 0.5729 millimoles KOH equivalent/gram (32.1 mg KOH equivalent/gram). It was stirred with demulsifier "23025R" supplied by Baker-Hughes for one minute to a final concentration of 500 ppm. A wash consisting of 0.5 M sodium bisulfate solution in water was added to the oil (180 g solution, 0.09 mole sodium bisulfate). The volume of sodium bisulfate solution added was determined by equation 1:

$$\frac{(\text{oil mass})(\text{oil } TBN)}{(\text{sodium bisulfate molarity})}(0.6).\qquad \text{Equation 1}$$

The glass liner and its contents were inserted into a one liter Parr pressure reactor. The reactor was purged with nitrogen, then sealed and heated to 95° C. where it was stirred at 300 RPM for 10 minutes. Stirring was stopped and the reactor was allowed to settle for 30 minutes at 90° C. The reactor was then cooled to room temperature and opened up. The phases separated well; the lighter top phase consisted mainly of oil and the heavier bottom phases consisted of water, sodium bisulfate, sodium phenoxide, various sodium salts, and other caustic residues. The bottom phase was extracted away from the oil. For more complete drying, the oil was centrifuged at 70° C. for 30 minutes. The residual water was removed. At this stage, after the completion of the acid wash, the oil TBN was 4.116 mg KOH equivalent/gram and the oil TAN was 2.071 mg KOH equivalent/gram. The dried oil was transferred into a one liter glass liner (180.2 g). A water wash solution consisting of 2% sodium chloride and 500 ppm tetrabutylammonium hydroxide (TBAH) was added to the oil (181.1 g). The glass liner was transferred to the one liter Parr pressure reactor. The reactor was sealed and heated to 95° C. where it was stirred at 300 RPM for 10 minutes. Then, stirring was suspended and the reactor was allowed to settle for 30 minutes at 90° C. The reactor was then cooled to room temperature and opened up. The phases separated well and the oil was further dried in a centrifuge at 70° C. for 30 minutes. The dried oil was analyzed and the results showed a TBN of 4.06 mg KOH equivalent/gram, and a TAN of 1.750 mg KOH equivalent/gram. The oil was found to contain 0.0% wt sodium sulfite, 0.09% wt sodium sulfate, the caustic content was 0.0% wt, and the water content was 1.1% by volume.

Example 64

A bitumen sample with an initial TBN of 4.5 mg KOH equivalent per gram of oil and an initial TAN of 2.0 mg KOH equivalent per gram of oil was subjected to continuous sulfoxidation and continuous desulfonylation in a manner consistent with this disclosure. The caustic was allowed to settle in a continuous gravity separation vessel. The caustic phase was removed out the bottom of the vessel, while the sulfite and sulfate containing bitumen phase was removed out the top of the vessel. This treated bitumen stream contained 4.4% wt sodium sulfite, 1.7% wt sodium sulfate, and 5.2% wt caustic components. The TBN was 33.0 mg KOH equivalent per gram of oil. Heptane was continuously blended into this stream at a rate of 1.8 grams per minute. Oil-soluble demulsifiers "1755" and "23025R" supplied by Baker-Hughes were then blended continuously into this stream to a concentration of 750 ppm and 1500 ppm respectively.

This bitumen stream was fed at a rate of 11.5 grams per minute into a continuous stirred tank vessel. An aqueous wash solution containing 6% wt sodium bisulfate in water was also fed into the same vessel at a rate of 12.0 grams per minute. The vessel was continuously stirred at 300 RPM, the temperature was held at 95° C., and the pressure was held at 130 psig. The residence time inside the vessel was 10 minutes. The output of this vessel was fed to a separating vessel containing electrodes immersed in the oil phase to enhance separation. The temperature of the separating vessel was held at 115° C., and the pressure was held at 130 psig. The electrodes were spaced 1.5 inches apart. A voltage of 1000 volts with a current of 50 milliamps was continuously applied.

The residence time inside the separating vessel was 90 minutes. The aqueous phase was removed out the bottom of the separating vessel. The bitumen phase was removed out the top of the vessel, and fed to a second continuous mixing vessel at a rate of 12 grams per minute. An aqueous wash solution containing 2% wt sodium chloride in water was also fed into the second mixing vessel at a rate of 12.0 grams per minute. The vessel was continuously stirred at 150 RPM, the temperature was held at 95° C., and the pressure was held at 130 psig. The residence time inside the vessel was 10 minutes.

The output of this vessel was fed to a separating vessel containing electrodes immersed in the oil phase to enhance separation. The temperature of the separating vessel was held at 115° C., and the pressure was held at 130 psig. The electrodes were spaced 1.5 inches apart. A voltage of 1000 volts with a current of 50 milliamps was continuously applied. The residence time inside the separating vessel was 90 minutes. The aqueous phase was removed out the bottom of the separating vessel. The bitumen phase was removed out the top of the vessel at a rate of 11.5 grams per minute, and analyzed for sodium sulfite, sodium sulfate, TBN, and TAN. The oil was found to contain 0.0% wt sodium sulfite, 0.1% wt sodium sulfate, a TBN of 3.9 mg KOH equivalent per gram of oil, and a TAN of 1.7 mg KOH equivalent per gram of oil. The caustic content was 0.0% wt, and the water content was 0.5% by volume.

While only certain embodiments have been set forth, alternatives and modifications will be apparent from the above description to those skilled in the art such as the application of the disclosed techniques and apparatus to crude oil, bitumen, kerosene and other fuel streams and the use of similar reagents for converting oxidized-heteroatom-containing hydrocarbons to non-ionic hydrocarbon products. These and other alternatives are considered equivalents and within the spirit and scope of this disclosure and the appended claims.

The invention claimed is:

1. A method for reducing heteroatom content of a hydrocarbon feed comprising the steps of:
   oxidizing the hydrocarbon feed to an oxidized heteroatom-containing hydrocarbon feed;
   contacting the oxidized heteroatom-containing hydrocarbon feed with a caustic treatment solution comprising a phenol-derived catalyst, a caustic and a selectivity promoter;
   producing from said contacting step, a hydrocarbon product having a heteroatom content that is less than the heteroatom content of the oxidized heteroatom-containing hydrocarbon feed.

2. The method of claim 1 wherein the contacting step occurs under biphasic conditions, producing a hydrocarbon phase and an aqueous phase, wherein the hydrocarbon phase includes the hydrocarbon product having the heteroatom content that is less than the heteroatom content of the hydrocarbon feed, and at least one of a sulfate salt, and sulfite salt and wherein the aqueous phase comprises the caustic and the selectivity promoter.

3. The method of claim 2, further comprising the steps of:
separating the hydrocarbon phase from the aqueous phase;
mixing the hydrocarbon phase with an aqueous wash feed, producing a washed hydrocarbon phase and an aqueous wash phase; and
extracting the washed hydrocarbon phase from the aqueous wash phase.

4. The method of claim 3, wherein the aqueous wash feed is a solution of sodium hydrogen sulfate dissolved in water.

5. The method of claim 4, wherein the sodium hydrogen sulfate has a concentration that is approximately ≤50% by weight.

6. The method of claim 3, wherein the aqueous wash phase comprises at least one of sodium sulfate, sodium bisulfate, sodium phenoxide, sodium sulfite, sodium hydrogen sulfite, selectivity promoter and one or more caustic byproducts.

7. The method of claim 3, wherein the extracting step includes separating the washed hydrocarbon phase from the aqueous wash feed by providing an electric voltage to the mixture.

8. The method of claim 7, wherein the electric voltage is approximately ≤2000 v.

9. The method of claim 3, further comprising the steps of:
mixing the washed hydrocarbon phase with a second aqueous wash feed, producing a final hydrocarbon product having a sulfite salt concentration or sulfate salt concentration that is less than the sulfite salt concentration or sulfate salt concentration of the hydrocarbon product and a second aqueous wash phase; and
extracting the final hydrocarbon product from the second aqueous wash phase.

10. The method of claim 9, wherein the second aqueous wash feed comprises a salt dissolved in water.

11. The method of claim 9, wherein the second aqueous wash feed has a density greater than the washed hydrocarbon phase.

12. The method of claim 10, wherein the salt comprises a cation, selected from the group consisting of an alkali metal, alkaline earth metal, and organic heterocyclic-cations, and mixtures thereof, and wherein the salt has an anion selected from the group consisting of one or more halogens, sulfite, sulfate and a combination thereof.

13. The method of claim 10, wherein the second aqueous wash feed further comprises tetra-n-butyl ammonium hydroxide (TBAH).

14. The method of claim 9, wherein the second aqueous wash phase comprises at least one of water, sodium chloride, sodium sulfate, sodium bisulfate, sodium phenoxide, sodium sulfite, sodium hydrogen sulfite, TBAH, selectivity promoter and one or more caustic byproducts.

15. The method of claim 9, wherein the step of extracting step includes separating the final hydrocarbon product from the second aqueous wash phase by providing a second electric voltage to the mixture.

16. The method of claim 9, wherein the second electric voltage is approximately ≤2000V.

17. The method of claim 1, wherein the phenol-derived catalyst is selected from the group consisting of a novolac resin, a resol resin, a calixarene, lignin, a siloxy phenol, Black liquor and a combination thereof.

18. The method of claim 17, wherein the calixarene is p-tert-butylcalix[n]arene, where n denotes the number of phenol groups, and is approximately 3 to 30.

19. The method of claim 1, wherein the caustic is selected from the group consisting of an inorganic oxide having a group IA metal, an inorganic oxide having a group IIA metal, an inorganic hydroxide having a group IA element, an inorganic hydroxide having a group IIA element, an alkali metal sulfide, an alkaline earth metal sulfide, an alkali metal carbonate, an alkaline earth metal carbonate, a phosphate salt, a silicate salt, mixtures and molten mixtures thereof.

20. The method of claim 19, wherein the caustic is selected from the group consisting of $Li_2O$, $Na_2O$, $K_2O$, $Rb_2O$, $Cs_2O$, $Fr_2O$, BeO MgO, CaO, SrO, BaO, $Na_2S$, $K_2S$, LiOH, NaOH, KOH, RbOH, CsOH, FrOH, $Be(OH)_2$, $Mg(OH)_2$, $Ca(OH)_2$, $Sr(OH)_2$, $Ba(OH)_2$, $Na_2CO_3$, $K_2CO_3$, $CaCO_3$, $MgCO_3$, $BaCO_3$, sodium pyrophosphate, potassium pyrophosphate, sodium tripolyphosphate, potassium tripolyphosphate, calcium pyrophosphate, magnesium pyrophosphate, barium pyrophosphate, calcium tripolyphosphate, magnesium tripolyphosphate, barium tripolyphosphate, sodium silicate and potassium silicate, calcium silicate, magnesium silicate, barium silicate, green liquor, mixtures and molten mixtures thereof.

21. The method of claim 1, wherein the selectivity promoter is selected from the group consisting of organic alcohol, morpholine, dioxane, dimethylethanolamine, methyldiethanolamine, mono ethanolamine, diethanolamine, triethanolamine, N-acetylglucosamine, glucosamine, crown ether, piperazine, choline hydroxide, benzyltrimethylammonium hydroxide, ethylene glycol, propylene glycol, glycerin, sugar, starches, cellulose, chitosan, hyaluronic acid diethylene glycol, triethylene glycol, polyethylene glycol, chitin and pectin.

22. The method of claim 1, wherein the contacting step occurs at a temperature ≤250° C., producing an intermediate selected from the group consisting of a hydrocarbon-containing sulfinate intermediate, a hydrocarbon-containing sulfonate intermediate and a combination of intermediates thereof.

23. The method of claim 22, further comprising the steps of:
removing the caustic treatment solution after the formation of the intermediate; and
reacting the intermediate with water to produce the hydrocarbon product having a heteroatom content that is less than the heteroatom content of the oxidized heteroatom-containing hydrocarbon feed.

24. The method of claim 1, wherein the hydrocarbon product is an aromatic hydrocarbon.

25. A method for reducing heteroatom content of a hydrocarbon feed comprising the steps of:
contacting an oxidized heteroatom containing hydrocarbon feed with a caustic treatment solution;
producing from said contacting step, a hydrocarbon phase having a hydrocarbon product and at least one of a sulfite salt and a sulfate salt, and an aqueous phase;
separating the hydrocarbon phase from the aqueous phase;
mixing the hydrocarbon phase with an aqueous wash feed, wherein the aqueous wash feed is a solution of sodium hydrogen sulfate dissolved in water, producing a washed hydrocarbon phase and an aqueous wash phase; and
extracting the washed hydrocarbon phase from the aqueous wash phase.

26. The method of claim 25, wherein the sodium hydrogen sulfate has a concentration that is approximately ≤50% by weight.

27. The method of claim 25, wherein the aqueous wash phase comprises at least one of sodium sulfate, sodium hydrogen sulfate, sodium phenoxide, sodium sulfite, sodium hydrogen sulfite, selectivity promoter and one or more caustic byproducts.

28. The method of claim 25, wherein the step of extracting includes separating the washed hydrocarbon phase from the aqueous wash feed by providing an electric voltage to the mixture of the hydrocarbon phase and the aqueous wash feed.

29. The method of claim 28, wherein the electric voltage is approximately ≤2000V.

30. The method of claim 25, further comprising the steps of:
mixing the washed hydrocarbon phase with a second aqueous wash feed, producing a final hydrocarbon product having a sulfite salt concentration or sulfate salt concentration that is less than the sulfite salt concentration or sulfite salt concentration of the hydrocarbon product and a second aqueous wash phase; and
extracting the final hydrocarbon product from the second aqueous wash phase.

31. The method of claim 30, wherein the second aqueous wash feed comprises a salt dissolved in water wherein the salt comprises a cation selected from the group consisting of alkali metal, alkaline earth metal, and organic heterocyclic-cations, and mixtures thereof and an anion selected from the group consisting of halogens and mixtures thereof.

32. The method of claim 31, wherein the second aqueous wash feed has a density greater than the hydrocarbon phase.

33. The method of claim 30, wherein the second aqueous wash feed further comprises tetra-n-butyl ammonium hydroxide (TBAH).

34. The method of claim 30, wherein the second aqueous wash phase comprises at least one of sodium chloride, sodium sulfate, sodium bisulfate, sodium phenoxide, sodium sulfite, sodium hydrogen sulfite, TBAH, selectivity promoter and one or more caustic byproducts.

35. The method of claim 30, wherein the extracting step includes separating the final hydrocarbon product from the second aqueous wash phase by providing a second electric voltage to the mixture.

36. The method of claim 35, wherein the second electric voltage is approximately ≤2000V.

37. The method of claim 1, wherein ≥20% of heteroatom-containing compounds in the hydrocarbon feed are converted to non-oxygenated, non-heteroatom-containing hydrocarbon compounds including biphenyls.

38. The method of claim 1, wherein ≤50% of heteroatom-containing compounds in the hydrocarbon feed are converted to oxygenated or heteroatom-containing compounds.

* * * * *